US008095536B1

(12) United States Patent
Kelly et al.

(10) Patent No.: US 8,095,536 B1
(45) Date of Patent: Jan. 10, 2012

(54) PROFITABILITY BASED RANKING OF SEARCH RESULTS FOR LODGING RESERVATIONS

(75) Inventors: Stewart A. Kelly, Cupertino, CA (US); Marcel D. Janssens, Palo Alto, CA (US); Matthew S. Garman, Evanston, IL (US)

(73) Assignee: Kayak Software Corporation, Norwalk, CT (US)

( * ) Notice: Subject to any disclaimer, the term of this patent is extended or adjusted under 35 U.S.C. 154(b) by 0 days.

(21) Appl. No.: 12/652,643

(22) Filed: Jan. 5, 2010

Related U.S. Application Data

(63) Continuation of application No. 11/296,156, filed on Dec. 6, 2005, now Pat. No. 7,668,809.

(60) Provisional application No. 60/636,241, filed on Dec. 15, 2004.

(51) Int. Cl.
*G06F 7/00* (2006.01)
*G06F 17/30* (2006.01)

(52) U.S. Cl. .............................. 707/723; 707/748; 705/5

(58) Field of Classification Search .................. 707/706, 707/723, 758, 999.003, 748; 705/5
See application file for complete search history.

(56) References Cited

U.S. PATENT DOCUMENTS

| | | | | |
|---|---|---|---|---|
| 5,864,818 | A * | 1/1999 | Feldman | 705/5 |
| 6,208,978 | B1 * | 3/2001 | Walker et al. | 705/38 |
| 6,360,205 | B1 * | 3/2002 | Iyengar et al. | 705/5 |
| 6,625,595 | B1 * | 9/2003 | Anderson et al. | 707/999.003 |
| 6,785,671 | B1 * | 8/2004 | Bailey et al. | 705/5 |
| 6,990,457 | B1 * | 1/2006 | Litman et al. | 705/5 |
| 7,212,978 | B2 * | 5/2007 | Kowal et al. | 705/5 |
| 7,330,826 | B1 * | 2/2008 | Porat et al. | 705/26 |
| 2001/0032194 | A1 * | 10/2001 | Kutsuzawa et al. | 705/80 |
| 2001/0054020 | A1 * | 12/2001 | Barth et al. | 705/37 |
| 2001/0056412 | A1 * | 12/2001 | Kutsuzawa et al. | 705/80 |
| 2002/0069093 | A1 * | 6/2002 | Stanfield | 705/5 |
| 2002/0072938 | A1 * | 6/2002 | Black et al. | 705/5 |
| 2003/0004760 | A1 * | 1/2003 | Schiff et al. | 705/5 |
| 2003/0061145 | A1 * | 3/2003 | Norrid | 705/37 |
| 2004/0044571 | A1 * | 3/2004 | Bronnimann et al. | 705/14 |
| 2004/0059610 | A1 * | 3/2004 | Winterton et al. | 705/5 |
| 2004/0193457 | A1 * | 9/2004 | Shogren | 705/5 |
| 2005/0004830 | A1 * | 1/2005 | Rozell et al. | 705/10 |
| 2005/0033613 | A1 * | 2/2005 | Patullo et al. | 705/5 |

* cited by examiner

*Primary Examiner* — Phong Nguyen
(74) *Attorney, Agent, or Firm* — Fenwick & West LLP

(57) ABSTRACT

A method and apparatus are provided for a dynamic information connection search engine. User actions may be detected on at least one client system. In response, a determination may be made whether the user is searching for supported information. When the user is searching for supported information, information may be extracted electronically from, for example, third party websites, direct supplier connections, and/or intermediate databases. Potential suppliers may be automatically selected in response to the detected user search. Queries may be formulated from the user search and transferred to one or more selected suppliers over a network coupling (e.g., the Internet and/or an intranet). The queries may include one or more requests for information. One or more responses may be received from the suppliers, and the responses may be used to generate a result list for the user. The result list may include information and/or query status information. Further, an electronic link may be provided to a website of one or more of the supplies from which the information was derived.

15 Claims, 13 Drawing Sheets

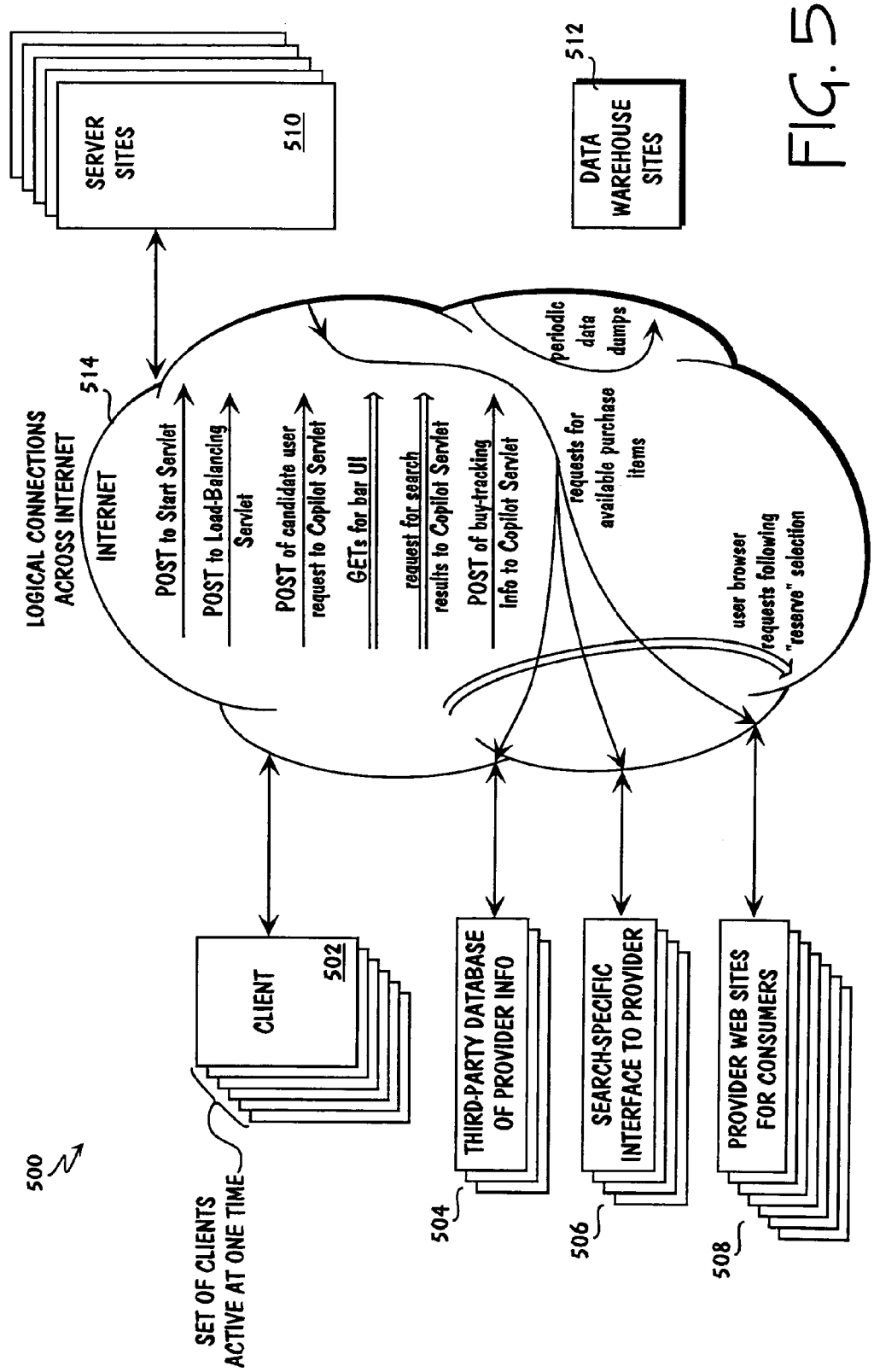

PROFITABILITY BASED RANKING OF SEARCH RESULTS FOR LODGING RESERVATIONS

RELATED APPLICATIONS

This application is a continuation of U.S. patent application Ser. No. 11/296,156, filed Dec. 6, 2005, which application claims the benefit of U.S. Provisional Application No. 60/636,241, filed Dec. 15, 2004, which applications are incorporated by reference herein in their entirety.

FIELD OF THE INVENTION

The present invention relates to a method and apparatus for a dynamic information connection search engine.

More particularly, one embodiment of the present invention relates to an apparatus (and associated method) used to find and present information from multiple sources.

In one example (which example is intended to be illustrative and not restrictive), the information may be found on the Internet from suppliers or purchasers of goods, services and/or commodities and presented to one or more potential (or actual) purchasers or suppliers (e.g., one or more purchasers and/or suppliers performing comparison).

For the purposes of the present application the term "search system" (or "search engine") is intended to refer to a system for searching for information (e.g., relating to travel) and/or for facilitating one or more transactions associated with the information (e.g., one or more purchases of travel related items).

Further, for the purposes of the present application the term "real time" is intended to refer to an essentially instantaneous or interactive process (as opposed to a process which occurs relatively slowly, in a "batch" or non-interactive manner).

BACKGROUND OF THE INVENTION

Various systems and methods directed to searching for information (e.g., information accessible via the Internet) have been provided. One example is U.S. Pat. No. 6,360,205, issued Mar. 19, 2002 to Iyengar et al. This patent is entitled "Obtaining And Utilizing Commercial Information" and discusses a "method for providing reservation information related to airline flights, lodging, transportation and the like using a communications network".

BRIEF DESCRIPTION OF THE DRAWINGS

FIG. 5 shows a block diagram of a transaction process flow according to an embodiment of the present invention;

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Of note, various embodiments of the present invention may provide a method and an apparatus for gathering, processing and/or delivering information relevant to one or more implicit and/or explicit user queries. In one example (which example is intended to be illustrative and not restrictive), the dynamic information connection search engine (sometimes referred to herein as the "search system") may specifically address, but is not limited to, user queries related to: (a) travel itineraries; (b) descriptions associated with a desired trip; and/or (c) information including different travel options that fit an itinerary and which the user can purchase. In another example (which example is intended to be illustrative and not restrictive), the user queries may be related, but are not limited to: (a) airline; (b) hotel; and/or (c) car rental information.

Figure 1:
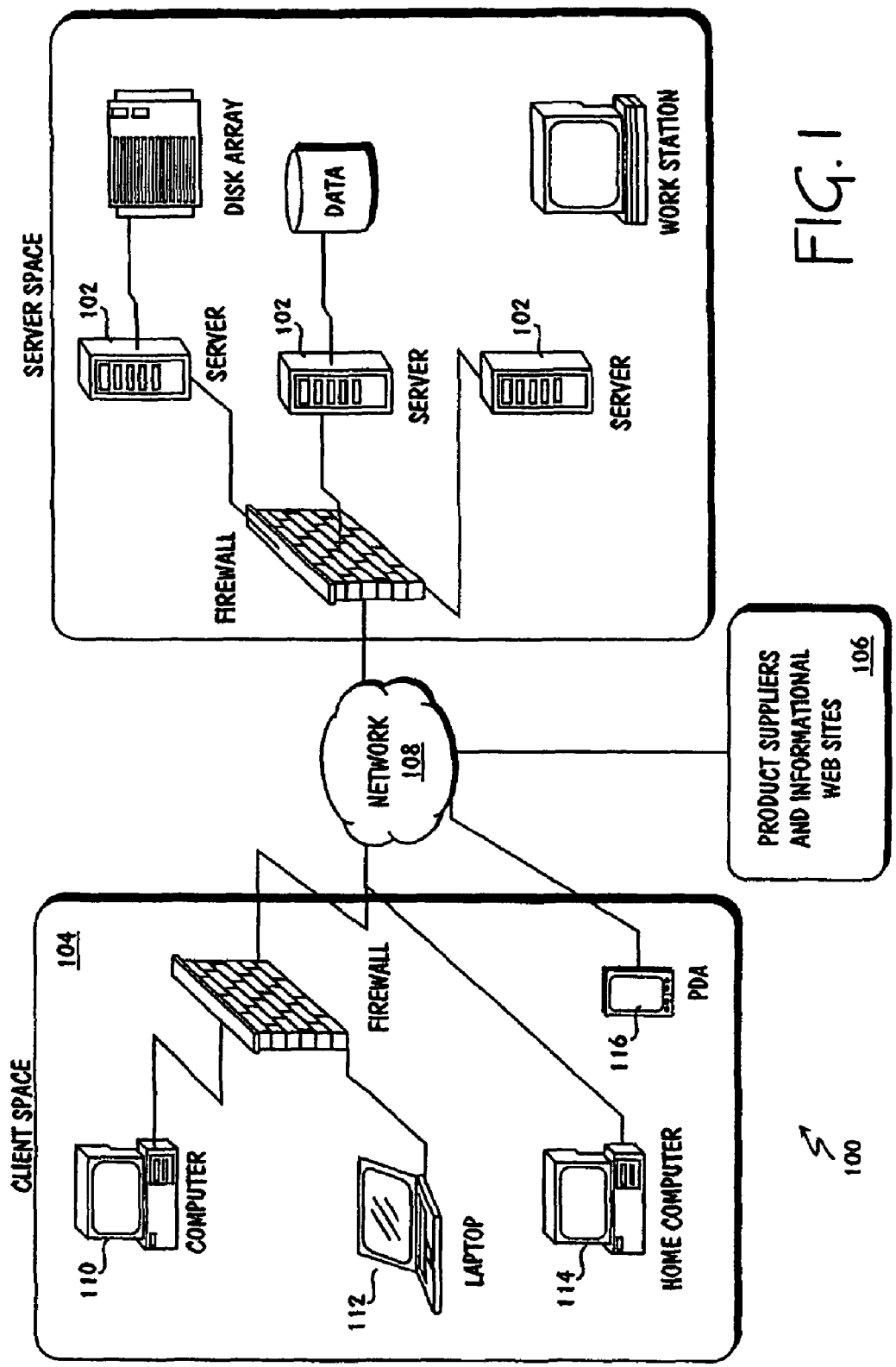
FIG. 1 shows a block diagram of search system architecture according to an embodiment of the present invention.

Referring now to FIG. 1, a block diagram of a search system architecture 100 according to an embodiment of the present invention is shown. As seen in this FIG. 1, the system architecture 100 may include one or more system servers 102 coupled among one or more client spaces 104 or client devices 110-116 and one or more product supplier and informational websites 106 via at least one network 108. The client devices 110-116 may include, but are not limited to, computers, personal computers, portable computing devices including hand-held computers, personal digital assistants, and cellular telephones. The client devices 110-116 may host standard web browsers and/or custom applications software. The network 108 may include, but is not limited to, wired networks, wireless networks, and combined wired and wireless networks. The search system architecture 100 may accommodate an optional firewall.

Figure 2:
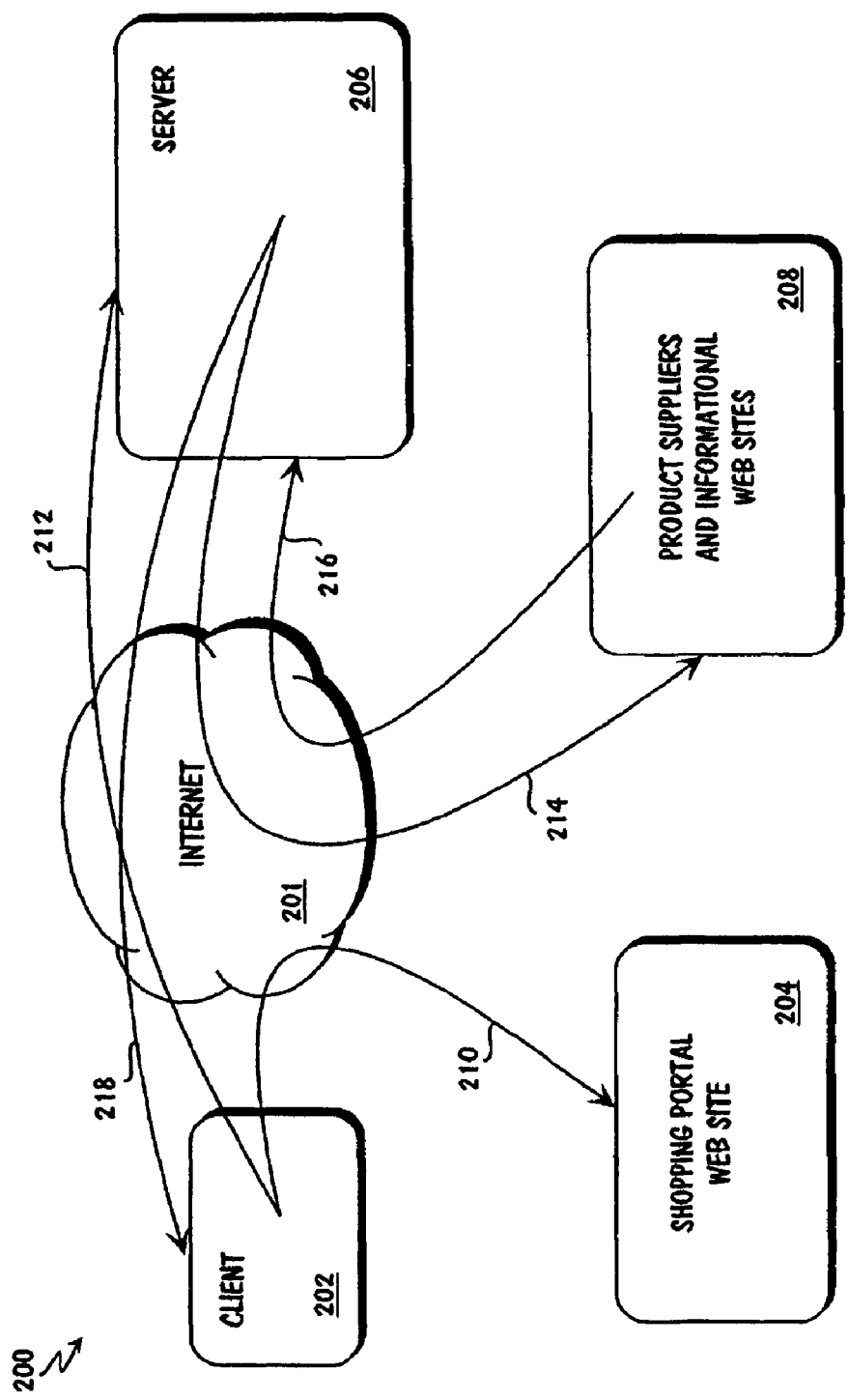
FIG. 2 shows a block diagram of a search system data flow according to an embodiment of the present invention.

Referring now to FIG. 2, a block diagram of a search system data flow 200 according to an embodiment of the present invention is shown. A seen in this FIG. 2, a user may browse the Internet 201 using a client 202 (e.g., software running on a client computer). The user accesses (see path 210) a World Wide Web site 204 (sometimes referred to herein as a "website"), in order to shop for a prospective purchase. The client software tracks the user's action(s), reporting (see path 212) all or some (e.g., a subset) of these actions to the system server 206 (sometimes referred to herein as a "server"). The server 206 collects this information and retains it for future use. The server 206 also analyzes (e.g., essentially immediately) the user action(s) and, in response, makes one or more electronic requests 214 (sometimes referred to herein as "shadow requests") to product and information suppliers 208 (sometimes referred to herein as "suppliers") to obtain relevant data. Of note, a shadow request may communicate certain elements (e.g., key elements) of an action being taken by the user. In response to the shadow requests, the server 206 receives responses (see path 216) from the various product and information suppliers 208 available online. The server 206 evaluates the responses and formulates a response for the user. The response is transmitted (see path 218) to the client 202.

Figure 3:
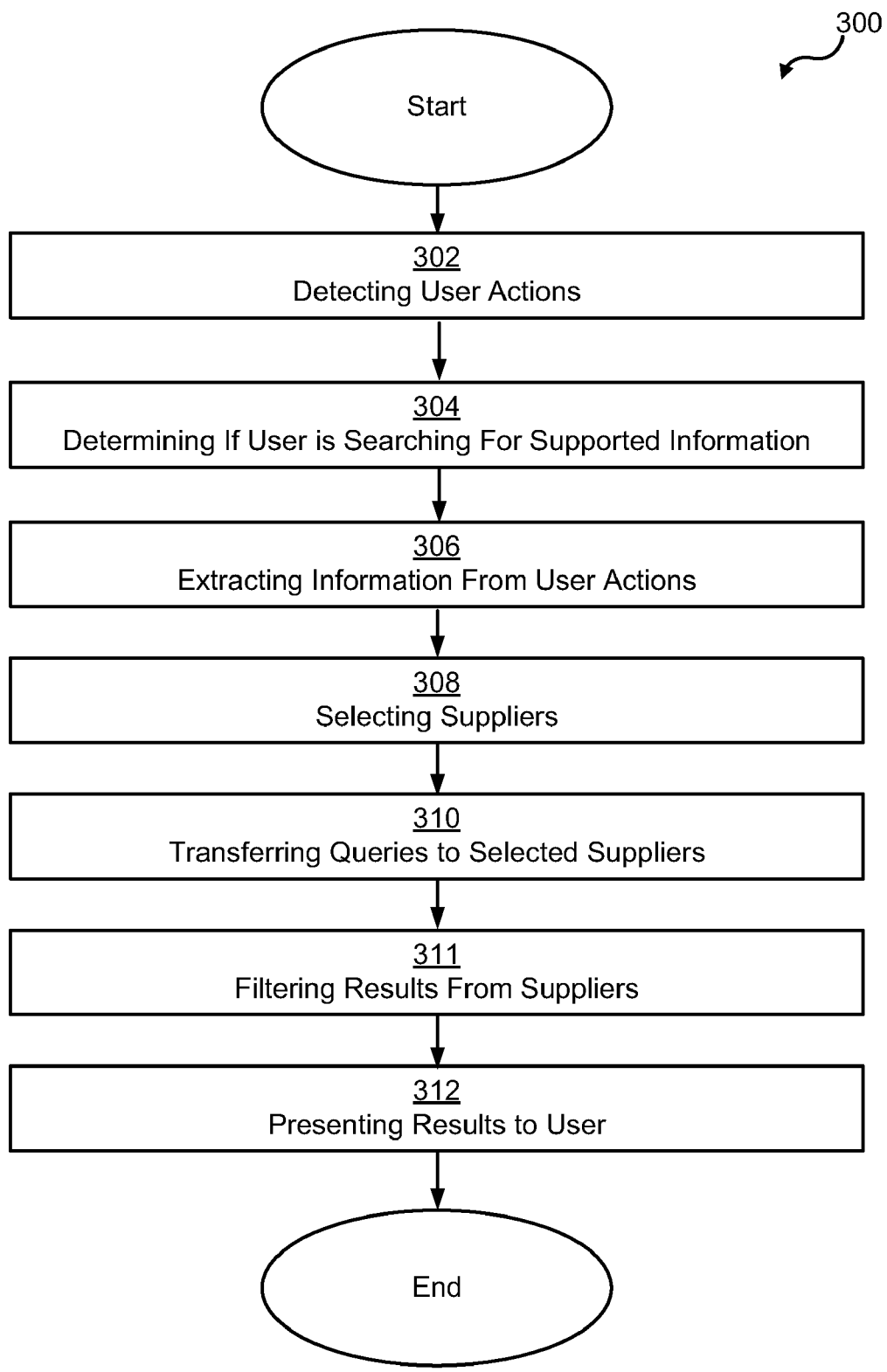
FIG. 3 shows a flow diagram of a dynamic information connection engine according to an embodiment of the present invention.

Referring now to FIG. 3, a flow diagram 300 of a dynamic information connection method according to an embodiment of the present invention is shown. As seen in this FIG. 3, user action(s) are detected on one or more client systems or access devices (see step 302). In response, a determination is made whether the user is searching for a supported type of information (see step 304). When the user is searching for a supported type of information (e.g., product or service purchase information), information is extracted from user actions (see step 306). One or more potential suppliers are selected (e.g., automatically selected) by a server in response to the product information (see step 308). One or more queries are formulated using the extracted information and transferred to each selected supplier over a network coupling (see step 310). The queries may include a request for product (or service) purchase information. One or more responses are received from the suppliers, filtered (see step 311) and the responses are used to generate a result list for presentation to the user (see step 312). The result list may include product (or service) purchase information and/or query status information. Further, an electronic link may be provided to a website of one or more suppliers from which a product (or service) can be purchased.

Figure 4:
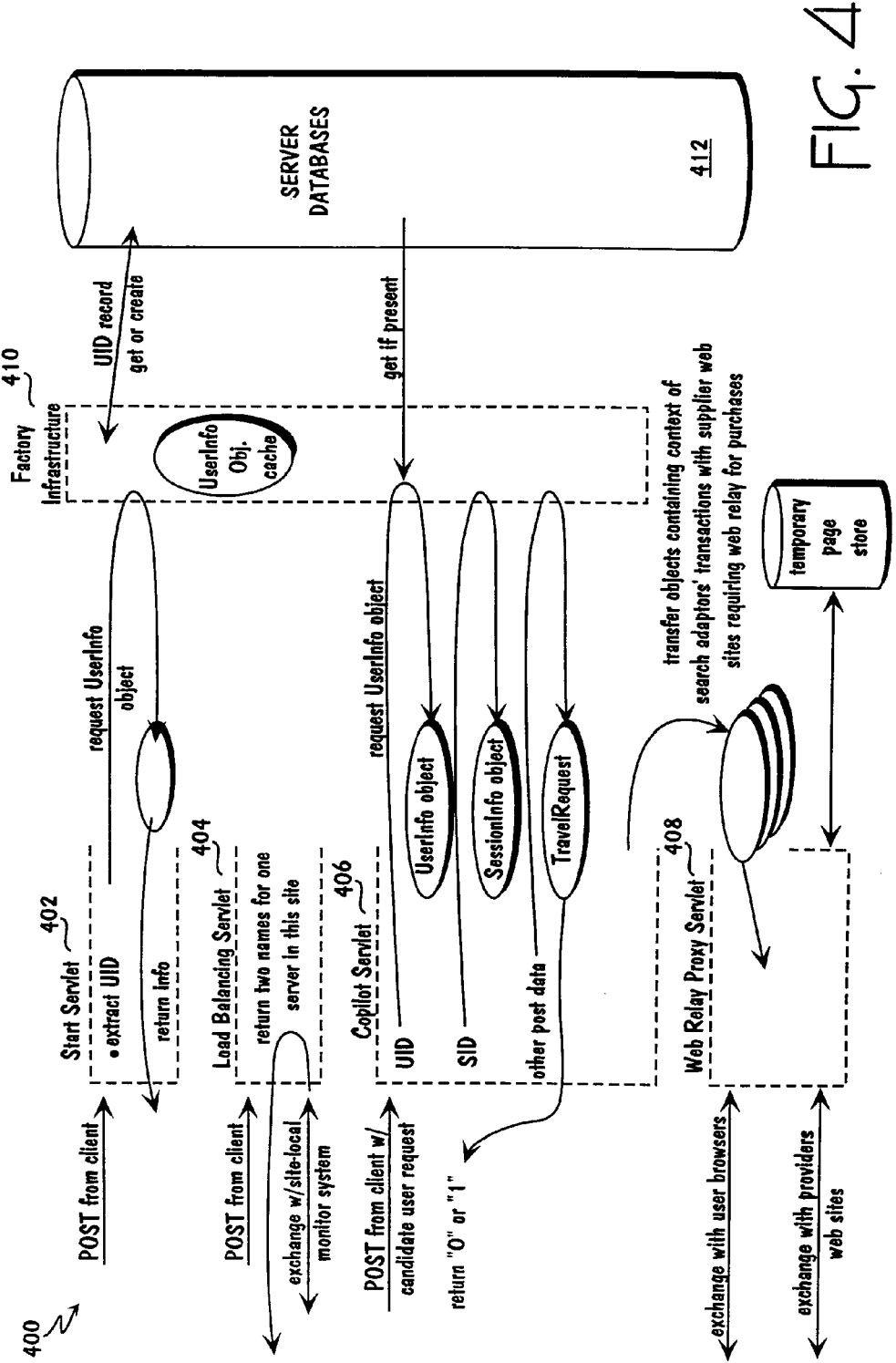
FIG. 4 shows a block diagram of server organization according to an embodiment of the present invention.

Referring now to FIG. 4, a block diagram of a server organization 400 according to an embodiment of the present invention is shown. As seen in this FIG. 4, a set of web server components, known as servlets, including a Start Servlet 402, a Load Balancing Servlet 404, a Copilot Servlet 406, and a Web Relay Servlet 408, along with a factory infrastructure 410 and server databases 412 may be utilized to support the server processing (of course, all of these elements are not necessarily required and/or additional elements may be utilized).

Referring now to FIG. 5, a block diagram of a transaction process flow 500 according to an embodiment of the present invention is shown. As seen in this FIG. 5, the system supports couplings among one or more clients 502, one or more third party systems 504, one or more search-specific interfaces 506, one or more provider websites 508, one or more server sites 510 and/or one or more data warehouses (or database sites) 512 using at least one network 514. The network 514 may include any number of networks (and may include, for example, the Internet).

Of note, while one embodiment of the present invention provides separate client and server portions (e.g., the user may interact with a client to input a travel itinerary and to view the results, while certain gathering and processing of information may be performed on a server (e.g., a central server)) other implementations may, of course, be provided. For example, other implementations may include (but not be limited to): (a) a wholly client implemented structure (b) a wholly server implemented structure; (c) a structure in which processing in the search system with which the user interacts (e.g., directly) could be made by a central server but with the actual data gathering carried out by the client system; and/or (d) a structure in which controlling decisions about what data should be gathered and processed could be made by a central server but with the actual gathering carried out by the client systems. Of note, each of the various implementations may alter the over-all usage of network bandwidth required by the search system.

In any case, and still referring to FIG. 5, it is seen in this FIG. that the different types of communication between a client 502 and a server 510 are ordered top-to-bottom to match the sequence with which these types of communication may be performed by a particular client 502. Of note, at any one time there may be a relatively large number of clients 502 communicating with each server system 510 as represented by the stack of clients 502.

Of further note, the client in one example (which example is intended to be illustrative and not restrictive) may interface with, incorporate and/or be incorporated into a standard web browser (e.g., an HTTP protocol client). This provides a simple, standardized mechanism for displaying results. The web browser may also used to view and interact with the websites of information suppliers (e.g., travel reservation suppliers) when the user decides to purchase one of the options (e.g., travel options) presented. In addition, the HTTP protocol may be used for communication between the client and system server.

Still referring to FIG. 5, it is noted that the server portion of the system may comprise a set of servlets accessed by the client making GET and POST HTTP transfer requests. In this regard, a servlet may be viewed as an ongoing process that services one or more requests received by a server (e.g., a web server). In one example (which example is intended to be illustrative and not restrictive), the servlets may be written in Java (and may be collectively managed by a standard container).

In the interest of clarity, only the interactions between a single instance of a client and a single server are illustrated in FIG. 5. However, it is to be understood that in actuality each different client may proceed through a possible sequence of operations independently and asynchronously of the others. In addition, the present invention may employ, for example, several different, parallel server systems at one or more different physical locations (e.g., in order to supply the necessary processing power and reliability)

In any case, the Start Servlet may handle the initial communication with a client that is just starting a session. Not only may the user's computer system that hosts the client be turned on and off repeatedly, but the actual client may not be used each time the user starts his/her computer system. Therefore, the server portion of the invention may be capable of handling a number of separate start/initialization cycles of each different client over the client's "life span".

One operation for which the Start Servlet may be responsible is the association of a client-generated user identification number ("UID") with each unique client, and for ensuring the existence of the appropriate user-specific entries in the server's database(s). The UIDs, as well as session IDs ("SIDs") and other identifier values used in various embodiments of the present invention may comprise, for example, 128-bit values (e.g., created such that the identifier values should be absolutely unique). In this regard, the identifier values may be created using the Windows Globally Unique Identifier ("GUID") mechanism (which is in turn based on the Open Software Foundation's ("OSF's") Universally Unique Identifier ("UUID"), a component of the OSF Distributed Computing Environment ("DCE")).

After the client has initiated communication with the server by making a request to the Start Servlet, the client may make a subsequent request to the Load-Balancing Servlet. The Load-Balancing Servlet may determine, for example, which of a number of server systems at a particular location (or at different locations) is in the best position to serve future requests for information coming from the requesting client in the current session.

The Copilot Servlet may be responsible for the fulfillment of other information requests from the client. The Copilot Servlet may receive requests from the client any time the web browser with which the client may be integrated is navigating to a Uniform Resource Locator ("URL"), or information identifier, which the client determines (more on the mechanism below) may be a request for supported information (e.g., travel information). In one example (which example is intended to be illustrative and not restrictive), the Copilot Servlet may respond to these requests in one of two ways, depending on the client's HTTP request.

In one situation, when the client's request does not contain adequate information (e.g., itinerary information) for the server to perform a search for supported information, the server may inform the client of this and no additional processing takes place. Of note, in an embodiment of the present invention designed to find and present a category of information other than travel alternatives, the type of URL/request screening could use different criteria than the examples given below, but the step could still be performed.

The other situation is in which the URL/request does contain itinerary (or other) information with which the server can search for and present information. In this case, the server may fulfill the request at once or over a period of time. For example (which example is intended to be illustrative and not restrictive), in connection with fulfilling the request over a period of time, the following may occur: (a) the server may send back a flag indicating that more information will be following; (b) the HTML and JavaScript template of the page that will be used to display the information found may be presented; and (c) the related information may be presented incrementally as it is found.

It is noted that while current common practice is to identify individual blocks of data accessible on the Internet using a URL, and various embodiments of the present invention are described in terms of using URLs, the present invention is not so limited. For example (which example is intended to be illustrative and not restrictive), systems which access information suppliers that are not typical websites (e.g., which use an access protocol other than HTTP) or which perform the accesses over a network other than the Internet may not use URLs to identify the source of a particular set of information. Similarly, in the future new mechanisms (possibly not intended to be human-readable like URLs) may be created to identify content available on a network. Modifications to the herein described embodiments of the present invention used to accommodate such changes in the underlying network technology used to connect among clients, servers, and information suppliers are implementation details intended to be encompassed by the present invention (in this regard, references to URLs in the description herein are reflective of present implementation practice rather than of constraints on the search system).

In another example (which example is intended to be illustrative and not restrictive), the client may be implemented as a collection of ActiveX objects which are designed specifically to operate with the Microsoft Internet Explorer (IE) browser under operating systems that support the ActiveX object technology (e.g., certain versions of Microsoft Windows). In this environment, it is possible for the client to establish a very intimate connection with the web browser. The client may use this connection to obtain each URL which the browser is requesting as the requests are made. The client may also use this connection to establish a sub-window (e.g., on the left-hand side of and within the main web browser window) which the client may use to display its user interface and results. Such a sub-window may hereinafter be referred to as a "Bar".

Of course, while the above description was provided as an example, it is noted that the Bar may be displayed on any portion of the browser window or in its own window (and is, therefore, not limited to the left side of a browser window). Further, the visible, on-screen area occupied by the Bar may be filled with a "browser control". In this regard, it is noted that a browser control is an ActiveX software object capable of interpreting HTML information and presenting it, interactively, to a user. In this way, a browser control is similar to the active display area of the IE web browser, stripped of all of the menus, toolbars, and other user-interface objects normally present when IE is run as a stand-alone application. The Bar may make use of a browser control to display its user interface (UI) and content, and the implementation of the client user interface may, for example, be partitioned between the compiled software that makes up the Bar and other client ActiveX objects and the JavaScript source embedded within the HTML displayed in the browser control.

It is to be noted that the Bar of one embodiment of the present invention may be opened either explicitly by the user and/or automatically. In one example (which example is intended to be illustrative and not restrictive), if the user explicitly requests that the Bar be opened, the client may generate a special URL and request for the Copilot Servlet. This request may return the HTML and JavaScript source for the client user interface, so that the user may directly enter itinerary information for use in performing a travel search (e.g., rather than depending on the pages of a third-party website to provide the itinerary-entry user interface).

In another example (which example is intended to be illustrative and not restrictive), the Bar may be opened automatically by the client when the client has made a request of the Copilot Servlet and the Copilot Servlet has responded to the request with a flag indicating that more information will be sent (the HTML that makes up the balance of the Copilot Servlet response may then displayed within the Bar).

In operation, the user may access the search system of an embodiment of the present invention using a computer hosting a client. As noted above, in one example (which example is intended to be illustrative and not restrictive), the client may be implemented (in whole or in part) as a collection of ActiveX objects. In this regard, users may be provided access to the client by packaging the ActiveX objects into a Dynamic Link Library ("DLL"). The DLL, along with associated control files, may reside in a cabinet ("CAB") file so that it can be downloaded (e.g., automatically) from a website. In implementations of the invention which are not ActiveX-based and/or specific to Microsoft IE, the client can be packaged, for example, as plug-in modules for a web browser so they can be downloaded and installed from a website.

The website from which the client is downloaded may include, but is not limited to, scripting to detect the type of browser with which the user is accessing the website, so that the user may be informed of the level of support for their browser and/or so that the user can automatically be directed to the correct download file for their browser. The website may also include a user interface to collect registration information from the user (e.g., the website may pass the registration information to the client for transmission to the server for inclusion in the user's database entry). Additionally, the website may include a final URL that causes the Bar to automatically open.

In another example (which example is intended to be illustrative and not restrictive), one or more of the ActiveX objects that make up the client may contain Automation Methods that can be called by JavaScript software within the web pages of the client-installation website. These methods may be used by the website to find out configuration information about the user system that is not ordinarily available, so that the information may be used to give the user more customized information about the client operation.

Figure 6A:
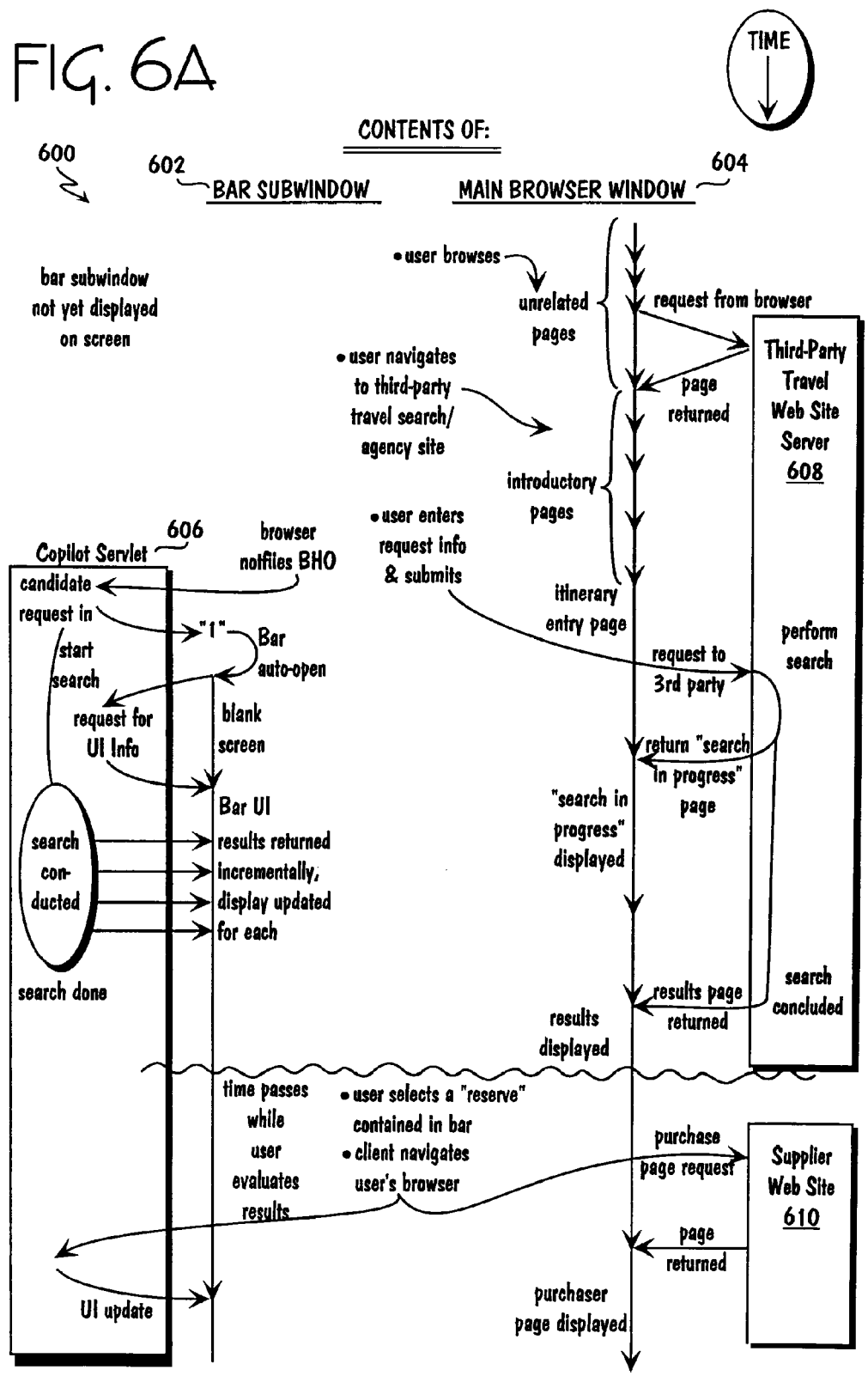
FIGS. 6A and 6B show user operation and information flow of a search system according to an embodiment of the present invention.
Figure 6B:
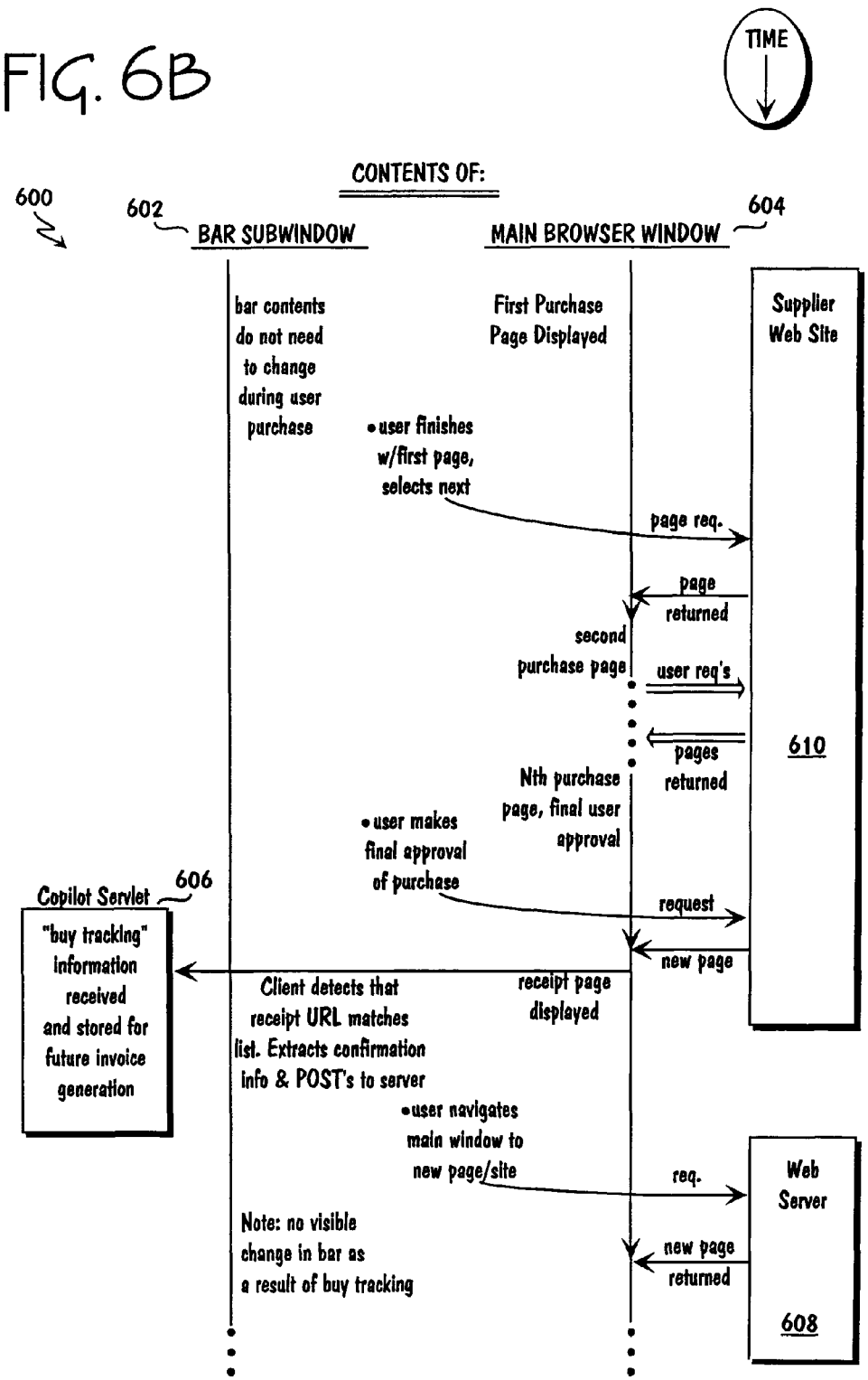

Referring now to FIGS. 6A and 6B, user operation and information flow 600 of a search system of an embodiment of the present invention is shown. As seen in these FIGS. 6A and 6B, the information is transferred among a Bar sub-window 602 and a browser window 604 of a client computer, at least one component of a server system 606, at least one third party server 608, and at least one supplier website 610. At the highest level, the search system locates and presents information relevant to a user request. In this example (which example is intended to be illustrative and not restrictive), user requests include the itinerary for a potential trip and the information returned includes available, purchasable travel alternatives that meet the requirements of the itinerary.

Still referring to FIGS. 6A and 6B, it is seen that in one embodiment of the present invention the general flow of processing for each request (e.g., itinerary) begins when the user enters itinerary information through an itinerary-entry page of a website. The itinerary information is transferred from the client to the server. The server reviews the itinerary information and determines the travel-suppliers that are most likely to have relevant and available purchasable options. The server couples to the appropriate systems of selected travel suppliers (omitted from the illustration for clarity) and makes queries about the available travel options matching the itinerary. The couplings to travel suppliers can be made numerous ways including, but not limited to, requesting pages from their websites and extracting information from the pages returned and/or using one or more proprietary connections (e.g., intended solely for inquiries to a supplier from the search system). When coupling through a proprietary connection, an intermediary can be used that also contains information about the travel supplier's inventory (for example (which example is intended to be illustrative and not restrictive), a Global Distribution System ("GDS") database).

In one example (which example is intended to be illustrative and not restrictive), the server may return boiler-plate data display and formatting information to the client (the user interface, UI, displayed within the Bar). As results are received from each queried travel supplier, the results may be evaluated and processed for possible transmission to the client along with search progress status information. When all results have been received from the queried travel suppliers, final "search complete" status information is sent to the client.

Of note, the search system of this embodiment of the present invention may automatically detect and interpret user requests for relevant types of information (that is, the search system may detect user actions and interpret them as implicit requests for information).

In this regard, when examining user actions to determine if a search operation can be started, information may be accumulated from a sequence of actions up through a final trigger event. For example (which example is intended to be illustrative and not restrictive), if a user has entered information on a web page, or in a sequence of successive web pages, the triggering event might be the activation of a submit-type control on the final page. However, the present invention may use all (or any desire part) of the entered information to determine if the final user action (the submit) should be used to start a search.

Of course, the above example is neither the least nor most complicated instance of monitoring user actions that might be used in the present invention. Other examples of user actions/input that might be used include, but are not limited to: detection of the selection of a single control or sequence of controls that indicate an interest in a supported type of information; entry of information by the user in a control or sequence of controls; entry of information through natural-language or N-gram techniques; and/or selection of a pre-existing set of information as identifying the user's interest.

It should be noted that the present invention may be configured to permit user input through (but not limited to): (a) typing; (b) pointing devices; (c) handwriting recognition; and/or (d) voice recognition.

It should also be noted that any methods for monitoring and evaluating user input may be applied to both user actions performed with respect to a third-party website as well as an interface of the client system or web page maintained by the search system operator.

Further, in another example (which example is intended to be illustrative and not restrictive), the monitoring of user activity (e.g., in an attempt to recognize actions that indicate a desire for the type of information that the search system has been implemented to collect and present) may be accomplished hierarchically. In another example (which example is intended to be illustrative and not restrictive), the client may be primarily responsible for monitoring user actions. In another example (which example is intended to be illustrative and not restrictive), the mechanism for this monitoring may be capturing the user's web browser's requests for new pages (of course, other mechanisms could be used to achieve essentially the same result or slightly different results for implementations designed to search for other types of information). In another example (which example is intended to be illustrative and not restrictive), the monitoring may be accomplished through a Component Object Model ("COM") interface (this interface may capture each URL, or "navigate event," that the browser is about to fetch).

In one embodiment, the first step in determining if the user is trying to find information (e.g., about travel alternatives) is to compare the root portion of the URL with a list of strings maintained by the client. In one example (which example is intended to be illustrative and not restrictive), this list may be stored in the Windows registry (a system database of configuration information). In another example (which example is intended to be illustrative and not restrictive), the list stored in the Windows registry may be updated by the server when it is out of date).

When a URL requested by the browser matches one of the URL strings (e.g., partial URL strings) stored by the client, the client forwards it (and possibly the associated data if the user's browser is making a POST request) to the Copilot Servlet portion of the server for further processing. The server determines if a particular user request both is a request for travel information and contains enough information to be considered an "itinerary" that can be used for a search. While the simple string comparison against the URL may be adequate for the needs of certain searches (e.g., certain travel-information searches), other embodiments of the present invention may use a different first-level analysis of user operations (e.g., as determined by the complexity of the information needed to perform the search).

The present invention may also accommodate a user providing his/her request directly into a web page (e.g., the entry of itinerary information into a web page). With this entry method, the user enters itinerary information directly into the HTML form that is part of the client user interface. This is possible, for example, if the user has loaded the HTML form in their web browser, when the user has opened the Bar explicitly, or after the Bar has automatically opened in response to a previous user action/input.

In general, a session starts the first time after the client has a need to contact the server, and continues either until one of the system timeout periods expires or until the user takes an explicit action that shuts down the client.

In one example (which example is intended to be illustrative and not restrictive), the installation of the client may comprise several operations that generally occur the first time the client starts after it has been installed and/or the first time a new client installation connects to the server. In particular, when first installed on a system the client may create a GUID to serve as the client's permanent ID number (it is noted that the User ID (UID) may actually be specific to a particular operating system installation rather than to an actual individual user).

In any case, the client attempts to make a connection to the server (starting a logical "session") only after the client reaches a point where it needs information from the server in order to continue. In one example (which example is intended to be illustrative and not restrictive), two cases in which this may occur are: (a) the user explicitly opens the Bar causing the client to need the HTML/JavaScript source for the user interface to be displayed; and (b) the client detects the browser attempting to load from a URL that is a candidate for containing an itinerary, in which case the URL (and possibly associated POST data) may be sent to the server for further analysis.

As an optimization, the software may check for the existence of a connection from the client to the Internet (and/or other coupled network) before attempting to communicate with the server. Since attempts to communicate with the server would fail in this condition anyway, this check may help prevent wasted processing and error-recovery.

The UID may not be required to be strictly permanent. In one example (which example is intended to be illustrative and not restrictive), the UID may be stored in the Windows registry and therefore subject to accidental or intentional deletion. Each time the client starts execution, it checks for a UID in the registry, and if one is not present it creates one. This portion of the client may create the UID after the initial installation so that installation is not actually handled as a special case. In the event that a client UID is destroyed and the client allocates another one, the only aspects of the system that are impacted are: (a) the ability to correlate user operations performed with the old UID and those performed with the new UID; and (b) the ability to retrieve the user's previously selected/specified personalization options.

In this regard, if the user provides personal information through the registration web page during the installation process, the client may forward the information to the Start Servlet when the client initiates contact. The server database records keyed by the UID may also contain user personal information. This information may be manipulated by the user through the user interface presented in the Bar.

Personal information may be used to control different aspects of the client behavior and/or of the server behavior toward a particular user. For example (which example is intended to be illustrative and not restrictive), the personal information may control whether a software client will be automatically updated if a newer client version is available. The personal information may also be used to guide the information search performed by the server. For example (which example is intended to be illustrative and not restrictive), where searches are performed for available airline tickets, the personal information may contain things like suppliers the user wishes to avoid, preferred ticket classes, senior citizen status, and/or other information that results in the availability of lower-cost fares.

In coupling to the server, a client may create a session identifier (SID). In one example (which example is intended to be illustrative and not restrictive), this may be another 128-bit, universally-unique identifier. The SID may be transferred in all future transmissions from the client that are part of the same session (the SID may allow the server to distinguish semi-simultaneous requests made by different clients and between requests originating from different browser windows on the same client).

The first exchange between the client and server in a session may be when the client performs an HTTP POST transaction with a destination URL that specifies the Start Servlet. This POST transaction transmits data including the UID, the SID, the personal information provided by the user (if it has not been previously transmitted), and the client's current version number.

In response to this POST, the Start Servlet returns several pieces of information including, for example, the version number of the latest client release, the version number of the lists of partial-URL strings stored by the client, and those items from the personal information associated with the transmitted UID that affect client operation. If the version number of the latest client release is larger (later) than the receiving client version number and the user has elected to receive client updates, the client may undertake downloading and installing the latest client version in parallel with subsequent primary operations. If the version number of the lists of partial-URL strings is larger (later) than the receiving client version number, the client may download new copies of the out of date lists. These lists may be used, for example (which example is intended to be illustrative and not restrictive), by the client to determine which URLs are candidates for itineraries and are to be forwarded to the server, and which URLs indicate the completion of a purchase by the user.

The Start Servlet may also perform several internal housekeeping functions. For example (which example is intended to be illustrative and not restrictive), the Start Servlet may verify that the supplied UID already has a matching record in the server database, and create a record if it does not. It may also create a "Session Info" object which will persist on the server for as long as the session remains active.

Referring now to FIG. 6B, another list of strings maintained by the client may be used as part of the mechanism for monitoring whether the user makes purchases from the websites (e.g., of travel suppliers) to which the search system directs the user (sometimes referred to herein as "buy tracking"). In one example (which example is intended to be illustrative and not restrictive), this list may contain a pair of strings for each entry.

The first string in the pair may be the URL, partial URL, or URL pattern of a page on the travel supplier's website to which users are directed on the completion of a purchase, typically a "receipt" page.

The second string in the pair may be an extraction specifier. The extraction specifier may specify the extraction of multiple distinct portions of a receipt page, including (but not limited to) specifying a particular region/string within the receipt page that should be extracted and transmitted back to the server. The extraction may occur over a sequence of pages if the necessary purchase identification information is found in more than one page. The string or strings extracted may typically be piece of data that uniquely identifies the purchase transaction, such as a reservation confirmation number. This may be used later as proof to the travel supplier that the purchase transaction originated from a referral by the search system of the present invention. This may also be used as the basis for a payment arrangement between travel suppliers (or other information suppliers) and the operator of the search system of the present invention.

Figure 7:
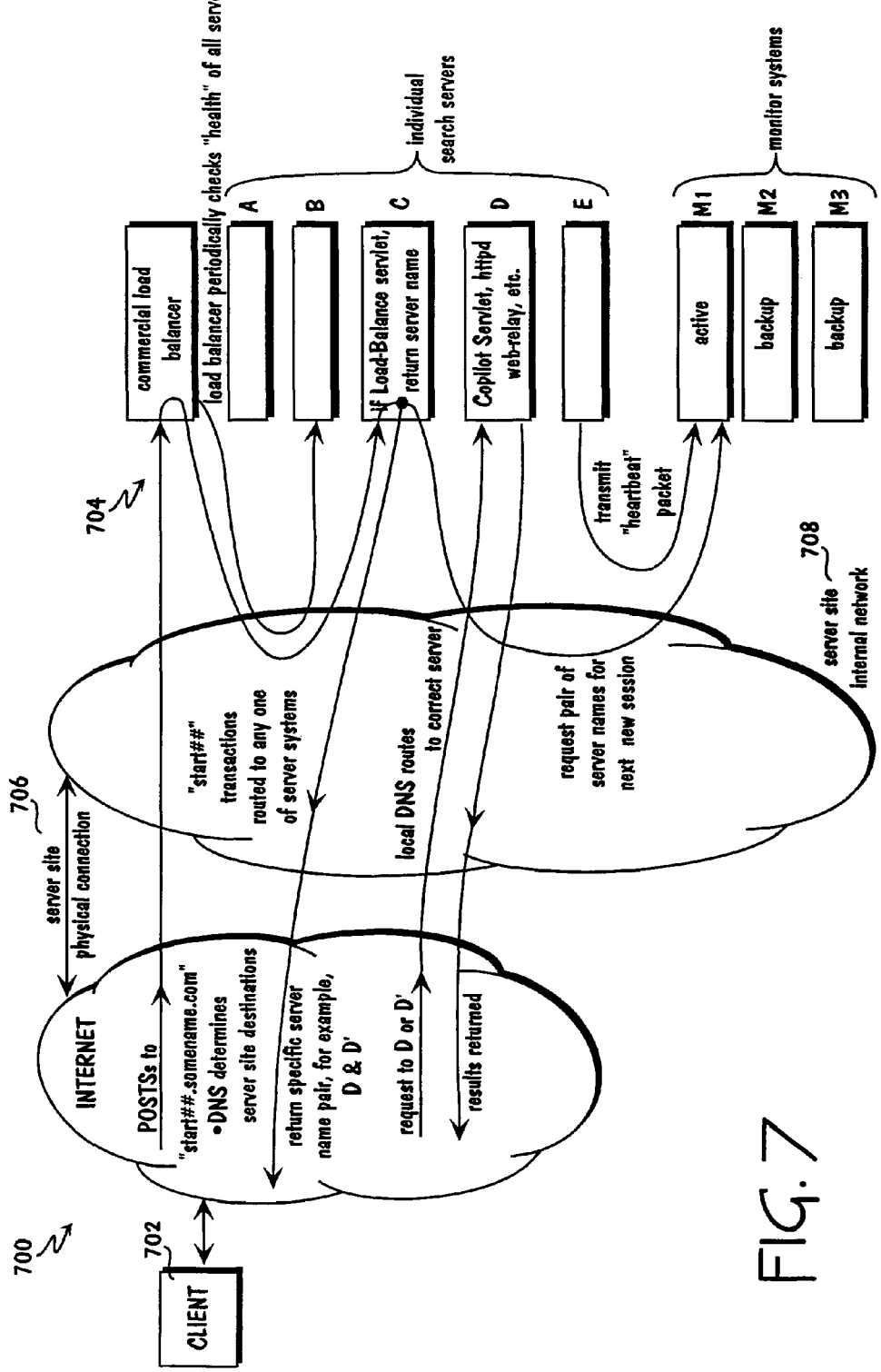
FIG. 7 shows a block diagram of load balancing according to an embodiment of the present invention.

Referring now to FIG. 7, a block diagram of a load balancing arrangement 700 of an embodiment according to the present invention is shown. As seen in this FIG. 7, the client system 702 is coupled to at least one server site 704 using at least one network coupling 706, for example via the Internet. Load balancing may be accomplished using a server site internal network 708 or backplane, but is not so limited. Alternate embodiments can use numerous types of couplings among the server components of the search system.

In order to ensure essentially simultaneous availability to a large number of users, the server portion of the system may be made failure-tolerant and may be scaled to supply the processing power and network bandwidth necessary to support large numbers of essentially simultaneous users. This may be accomplished using a number of separate, hierarchical mechanisms including, but not limited to: DNS, load balancers, round-robin techniques, and redundant backup monitor systems.

In one example (which example is intended to be illustrative and not restrictive), the present invention may utilize a dynamic two-level form of load balancing. The first level of load balancing may be accomplished through the Internet DNS service and may direct traffic to various data centers around the world (data centers may be easily added or removed and the amount of traffic sent to each data center may be controlled as desired (e.g., to a level of approximately 1% of the total traffic)).

The second level of load balancing may balance the traffic within each data center (cluster) and may use a combination of conventional load-balancing systems and search system-specific balancing methods. This technique may use information including CPU and memory usage, network bandwidth usage, and/or number of current users of the individual CPUs in performing load balancing.

Because the HTTP protocol is used for communication between the client and server in this embodiment, the client uses a specific server name to which requests are directed. For initial server contacts (e.g., exchanges with the Start Servlet and Load-Balancing Servlet), a server name may be constructed dynamically by the client prior to making the first request of a session (the server name is created, for example, by concatenating a number of string fragments).

More particularly, a first string fragment may be a string constant representing the fixed "base" part of the server name. Any string that is a legal Internet host name could be used (for example, the base string may be "start").

The next string fragment may be a produced by the client. The client may generate a random integer in the range of, for example, 0 to 99, inclusive. This integer may be converted to a two-character string.

Another string fragment may include a string constant representing the naming domain within which the server systems are located (for example, the domain may be of the form ".somename.com").

Assuming that the clients are implemented with a good random number generator, if a large number of clients are operating simultaneously, there should be a roughly equal number that have generated each of the 100 possible different server host names. There may be several benefits to having effectively divided the set of active clients into a large number of differentiable categories based on the host name which they have constructed.

In this regard, it is important to recognize the capabilities of the network of DNS servers that underlie the Internet and provide the translation between textual host names and numerical Internet Protocol (IP) addresses. First, even though different servers within a domain are logically related by the common parts of their domain name, there is no requirement that the corresponding IP addresses have any commonality or relationship. This allows, for example, the server identified by the host name "start00.somename.com" to be at an entirely different physical location from the one named "start01.somename.com".

Furthermore, multiple different host names may also be mapped to the same numeric IP address. This means that an entire block of host names, such as "start75.somename.com" through "start90.somename.com", and therefore a statistically-predicable portion of the total client traffic at any particular time, can be directed to a single server system/location.

Moreover, it is possible to modify the DNS mapping between host names and IP addresses. This allows the flow of traffic from some portion of the clients to be changed from one server to another without having to notify or directly communicate with the clients in any way. Further, because of the number of different host names that clients generate, the change from one server site/implementation to another can be performed gradually over time, with a resolution (in this example) of approximately 1% of the total client traffic.

Once the client has determined a server host name, and DNS look-up has obtained the current matching IP address, the client attempts to establish an HTTP connection with the server IP address. At this point, a conventional load-balancing system may be used to distribute the HTTP requests coming into a single IP address across multiple individual server systems.

One aspect of this embodiment which may be considered important in making it amenable to the use of conventional load balancers is that the client HTTP requests made of the Start Servlet and Load-Balancing Servlet do not depend on any state stored on the server. This may be considered important because with simple load balancing systems, there is typically no way to ensure that subsequent requests originating from the same client are directed to the same server without multi-processor support linking the various server systems (note that while the SID is included in the data sent to these two servlets, the servlets do not necessarily make use of it for anything other than error-checking, because of the lack of session-to-server continuity present for these two servlets in this embodiment).

Only requests for the Start Servlet and Load-Balancing Servlet use the host name that is generated by the client and which is handled by the load-balancer. It is the responsibility of the Load-Balancing Servlet to provide a server host name that the client can use for all requests that depend on server state, which are directed to the Copilot Servlet.

Each set of server systems serviced by a conventional load balancer may also be associated with one or more monitor systems. It should be noted that this designation is logical rather than physical, and a single computer system could serve both as a front end server and as a monitor, as well as fulfilling other rolls, such as the database server. Monitor systems may be responsible for: (a) accepting periodically-transmitted loading statistics from each of the front ends; (b) determining which front end systems have not reported statistics recently enough and which will therefore be considered "dead"; and/or (c) maintaining a circular list of the "not dead" front end servers, and returning the next server name from the list each time a server executing the Load-Balancing Servlet requests a server name to return to a client.

In this embodiment the monitor system is not responsible for notifying the load balancer of which servers are "alive" and "dead". Instead, the load balancer uses its typical mechanism, such as making periodic checks of each server's network responsiveness with a "ping".

When a client is in the process of establishing a session it makes a new HTTP POST request to the Load-Balancing Servlet once it has received a response from the Start Servlet. The data sent with this request includes the UID/SID pair. The Load-Balancing Servlet services this request by requesting the next available front-end server host name from the monitor system. It then returns the host name plus a set of configuration parameters to the client. The configuration parameters include, but are not limited to: (a) a flag instructing the client whether to use clear (HTTP) or encrypted (HTTPS) communication with the server for subsequent transactions; (b) the client timeout period for terminating a session due to user inactivity; and (c) the path from which a new version of the client can be downloaded by an existing client, which is used if the "latest client" version number returned by the Start Servlet is larger than the requesting client's version number and the personal information returned from the server for the current UID allows automatic updating of the client to occur.

In one example (which example is intended to be illustrative and not restrictive), the present invention may use two separate host names that are DNS-mapped to the same front-end server. Thus, the present invention may maintain two separate names for each front end server and return the matched pair of names to the client. This configuration may help avoid delays in system responsiveness associated with WININET.

More particularly, within a Windows system, most HTTP requests generated by software running on the system pass through a standard Windows library that contains common, low-level functions that implement large parts of HTTP. This library is called "WININET". In typical web browsing, most pages displayed actually cause a large number of discrete HTTP requests, one for the HTML source of the page along with additional requests for each embedded object. Because the client user interface displayed in the Bar may be implemented as a heavily-scripted web page, changes to the Bar's display would generally also cause the Bar's contained browser control to generate a number of HTTP requests through WININET to the client's assigned front-end server.

In order to optimize network bandwidth utilization, it is common for typical systems to start multiple HTTP requests simultaneously. WININET is no different and is also capable of processing several requests in parallel. However, the details of its implementation cause it to place a cap on the total number of requests that can be simultaneously active to the same internet domain name. When software (e.g., IE, a browser control, or a client component) issues a larger number of requests than this cap, WININET queues all but the first requests and starts them sequentially as in-process requests complete. In a typical web-browsing operation, this leads to a relatively high-performance system.

However, HTTP requests generated by the client may consist not only of fetches for elements of the client's user interface but also exchanges of control data (candidate search requests, purchase requests, transactions for session opening, closing and "keep alive", etc.). It is possible for the Bar to need to exchange control information with the server while a user-interface update/reload is in progress. If this occurs, WININET could queue the control transactions behind the (typically larger and less important) UI data fetches, causing a perceptible pause in the system's responsiveness to the user.

Thus, an embodiment of the present invention based on WININET overcomes this problem by having two separate server names for each physical server (IP address) within a server site. When this name pair is returned to the client by the Load Balance Servlet, one name is subsequently used for most URLs used to update the HTML displayed by the Bar and the other is used exclusively for control transactions (usually POSTs to the Copilot Servlet). Even though both logical names evaluate to the same IP address when a DNS lookup is performed, WININET's cap for the maximum number of pending transactions is implemented in terms of the logical name only, so that it treats the two server names as entirely independent and each has its own cap, even though they are physically the same device. Thus, in this embodiment, the client ensures that control transactions are never queued behind user-interface updates.

Another benefit of establishing separate server names for the control and (static) data-fetching transactions is that the server sites could be reorganized, in the event that such reorganization provides a performance improvement, into a set of servers that serve only static data and another set that run the servlets but do not serve the static data. With the structure described, such a reorganization could be performed in essentially any combination of server sites at any time and essentially transparently to the client systems.

In another embodiment of the present invention involving a group of front end servers, provision may be made for there to be multiple monitor systems. Each front end may have a list of all the available monitors. If the monitor at the top of the list stops responding to the transmission of loading statistics or to requests for front end server names from the Load-Balancing Servlet, then the front end server may move on to the next monitor system on its list. In this way, if a monitor system fails, the associated front end servers will gradually change over to using the next, or live backup, monitor system.

While an embodiment of the present invention may use a round-robin scheme for allocating new client sessions to the available pool of front end servers, a more complicated algorithm can also be employed. In this regard, each front end server may periodically send a variety of loading information to the monitor server (e.g., approximately once per second) and this information may be collected to provide statistics on the system's over-all operation as well as be used as the input to a more complicated, dynamic algorithm for determining which front end server should be assigned a particular client session.

For example (which example is intended to be illustrative and not restrictive), an alternate means for determining the server to which a particular new session is to be allocated may take into account the total number of active sessions on each server. The round-robin mechanism may be modified so that it allocates a session to a server only if that server already has fewer or the same number of active sessions as the server with the most active sessions.

In an embodiment of the present invention a typical Java Virtual Machine and execution environment known as "Tomcat" may be used to execute the servlets on the server systems. As part of Tomcat's initialization process following the boot-up of a server system, the server registers itself with the first monitor system on its list that will respond.

On each front end server is a process that periodically executes, collects performance and loading data, and transmits it to the current monitor system. This process may execute, for example, at the rate of approximately once per second (so that the transmission of performance data acts as a regular "heart beat" from the front end server that can be anticipated by the monitor system). The performance data packet transmitted by the front end server heart beat may include (but not be limited to) information about the server CPU usage, the current free memory of the system, and/or the number of database queries that the front end has generated (e.g., in the last second).

It is noted that rather than having two separate servlets and transactions to initiate the connection between the client and server, an alternate implementation may combine the functions and responsibilities of the Start Servlet and the Load-Balancing Servlet into a single servlet. This is possible because the client does not need any of the information returned from the Start Servlet in order to create its POST to the Load-Balancing Servlet. This alternate embodiment could, thus, provide an improvement in overall system performance because only a single client POST of information would be required and the servlet could return all of the necessary information in one response.

As mentioned above, the client of an embodiment of the present invention may maintain lists of strings that it uses to compare with the contents of different URLs. These lists can be updated from the server. These lists may be stored in the Windows registry (although any type of persistent client-accessible storage could be used).

As discussed herein, the search system may automatically open the Bar on the client browser and display information relevant to the user's current activity. One of the string lists maintained by the client may contain URLs (e.g., partial URLs) that the client matches against the URLs from which the user's browser attempts to load. When a URL matches, the client may forward the user browser request to the server for further checking. This hierarchy may serve to reduce the amount of client/server bandwidth that is consumed by monitoring URLs without unnecessarily complicating the operation of the client.

Referring again to the situation in which the client makes a request to the Copilot Servlet, the client may forward a URL from the browser along with any associated POST data. In one example (which example is intended to be illustrative and not restrictive), the server response may be an HTTP response packet containing either: (a) a single string "0", indicating that a search cannot be performed based on the data transmitted and that there will not be more data from this request; or (b) the string "1", indicating that a search has been started based on the data within the request (in this case, where the search has been started, the "1" is followed by the HTML and JavaScript source for the display of search results, followed by the results themselves).

In regard to the latter condition, the Copilot Servlet may send the processed search results to the client as they become available, along with status about the progress of the search. The client may repeatedly receive, for example, the total number of travel suppliers that are to be searched, the number that have returned responses to the server's search requests so far, and/or the total number of data items that have been found, processed, and sent to the client. This status information may be displayed for the user as it is received, in order to give the user the sense that things are progressing rapidly.

In one example (which example is intended to be illustrative and not restrictive), an area within the Bar may be used to display a vertically scrolling result list that presents summaries of the search items found. The items may be placed into this list based on a user-selected sort order. For example (which example is intended to be illustrative and not restrictive), the display of airline flights for an itinerary may be sorted based on the ticket price, the number of stops, departure time, arrival time, trip time, or supplier. In this example the sort is performed on the client (e.g., so that the system responds quickly to the user changing the sort selection for a progressing/completed search). In another example, the sort may be performed on the server.

Of note, in order to help ensure that user expectations are set correctly and/or to prevent resources from being "leaked" (allocated and not subsequently recovered for reuse), the client and server may (in one example) both track numerous types of time-out periods.

For example (which example is intended to be illustrative and not restrictive), the JavaScript that executes within the Bar may start a time-out counter each time a user action begins a new search. This counter may be used to control the period of time in which the search results are considered valid (which may be an important consideration when dealing with travel bookings, including airline tickets). In this regard, as search results expire, any electronic links provided to the associated supplier over which the associated travel item or component could be reserved or purchased may be deactivated.

In other words, since certain pricing and availability fluctuate rapidly (e.g., as relates to airline tickets), it may be important to prevent the user from attempting to purchase a ticket after it becomes unavailable. To enable this, the JavaScript may wait for a period of time (e.g., several minutes) after the start of the search. After this period, the JavaScript may notify the user that the results are no longer valid and the JavaScript may deactivate the purchasing controls associated with each result displayed.

In one example (which example is intended to be illustrative and not restrictive), the time-out period may be approximately 10 minutes. Of note, this time-out period should be closely related to the individual times that the travel supplier systems will hold a reservation for purchase after they respond to a query, a period that may have to be determined empirically and/or separately for each supplier. Therefore, the time-out period may be different in systems designed to search for different types of information, or different for each result item within a set of search results. Because the timeout may tracked be within the JavaScript code (which may be downloaded from the server each time the Bar is opened), the JavaScript code may be easily changed independently of having to create and distribute new clients.

Of note, this time-out may not be needed in a system configured to search for information that is not time sensitive. For example (which example is intended to be illustrative and not restrictive), a system that searches for purchasable goods with rapidly-varying inventory levels may use a time-out period to invalidate search results after some reasonable period. Alternately, a system that searches for reference information or for purchasable goods that are made-to-order (and which therefore do not have finite inventories) may not have to use a search results time-out.

In an embodiment of the present invention the same user action may trigger essentially simultaneous searches for all available sub-categories (e.g., air, hotel, car) of the supported type of information (e.g., travel reservations).

On the other hand, separate searches may be performed by the user for, e.g., airline reservations, rental car reservations, and hotel reservations. For example (which example is intended to be illustrative and not restrictive), the user may select among these three types of search using tab controls displayed in the Bar. The client-side JavaScript may be capable of maintaining separate sets of search results for each category once searches have been performed, and may have separate time-out counters for each. It may therefore be possible for the user to search for all three types of travel reservations, and for the user to switch back and forth among the different result displays without interfering with the separate expiration counts on each set of search results.

Because sessions consume server-side resources, it may be considered important to ensure that they do not persist and remain open indefinitely (as idle sessions could eventually accumulate and clog the server systems). Thus, in one example (which example is intended to be illustrative and not restrictive), there may be three mechanisms for closing sessions and allowing the associated server resources to be freed.

In one mechanism for closing sessions, the client may be explicitly "turned off" by the user closing related instances of his/her web browser. When this happens, one of the shut down operations performed by the client may be to send a POST to the Copilot Servlet informing it of the end of the session. On receipt of this message, the servlet may free its session-specific resources.

In another mechanism, the client may monitor user actions. Each user action performed that is related to the client's operation may be used to reset a time-out counter. If the user does not perform any operations before the time-out expires, the client may close the session and notify the server of the fact. In one example (which example is intended to be illustrative and not restrictive), the time-out for this period may be approximately 30 minutes (although it could be adjusted as desired).

One other mechanism may relate to a server time-out counter. This counter may be reset by each transmission from the client. If the time-out period elapses, the server may assume that something has happened to the client, such as an unanticipated loss of power, and the server may free the resources associated with the current session ID (SID).

In the unlikely event that the server times-out a session which is still active on the client, subsequent client transactions with the timed-out SID may still be honored so as not to frustrate user actions. Instead of rejecting the unexpected SID, a new server object maybe allocated for the SID and, since the occurrence of this condition could indicate an unauthorized attempt to access the system, the fact that it occurred may be logged.

Referring again to FIG. 6B, each item (e.g., purchasable travel reservation) that is found and reported to the user by the search system may be displayed along with a "reserve" user-interface control (or link or icon). When the user activates this control, the client may direct the user's web browser to the particular page of an associated supplier website from which the user can complete the purchase of the selected item.

The complexity of and mechanisms for performing this hand-off may depend on how the information was originally gathered from the supplier and on the structure and features of the particular supplier system. In one example (which example is intended to be illustrative and not restrictive), there are three general categories into which the different interfaces between the search system and the suppliers can be grouped.

In the first category, a search system may gather information using a special-purpose interface between the search system and the supplier servers. In a second category, a search system may gather information by accessing a third-party database which contains information about the supplier. In a third category, a search system may gather information from suppliers through a website designed primarily for direct interaction with individuals using web browsers.

Referring now more particularly to the first category, when a special-purpose interface is used between the search system and the suppliers, part of the interface design may include the creation of a mapping between the information returned and a point (e.g., URL) within the supplier's website. Thus, the majority of the burden of ensuring that the supplier websites can easily produce a "purchase" page for each item that may be returned by the supplier servers over the special-purpose interface may be assumed by the supplier.

On the other hand, cases in which the search system provides the user interface for purchase, but does not actually make the sale itself, may be referred to herein as "hosted booking" (because the booking process is "hosted" on the search system's servers). Hosted booking may be used in the case where the supplier has a web services interface for booking and doesn't provide its own human-usable (website) user interface. Hosted booking can also be used in cases where the search system is not structured to "hand off" the user's web browser from its own search results pages to the supplier website's purchase pages. In the case where hosted booking is used and the supplier's purchase process uses pages on its own website, the hosted booking process can be performed by presenting the user with one or more purchase pages from the search server, collecting information from the user through those pages, formatting that information (possibly adding information from the search system) to appear to the supplier's webserver as input from the server's own forms, and possibly extracting response data from the supplier for presentation to the user. In one example (which example is intended to be illustrative and not restrictive), the response data could consist of information such as a purchase confirmation or reservation number.

In addition to searching supplier websites and handing off users to the purchase pages of a supplier website, the system may be capable of performing the purchase hand-off by providing a travel agent number, otherwise known as an ARC number or IATA number, to the supplier. Thus, the owner of the ARC number may be able to collect a travel agency commission on the sale.

Referring now more particularly to the second category, when a third-party database is used the search system may be capable of causing the supplier website to generate a purchase page corresponding to the user selection. In the simplest case, this may entail creating a URL within the supplier website that contains information identifying the user selection. If the supplier website is not structured to use URLs that can be composed directly, then the search system may have to generate a sequence of accesses to the supplier website on the user's behalf in order to reach a point at which an appropriate purchase page is available.

This process of accessing and searching a supplier may be performed by a server component that is designed specifically to interface with, for example, a single supplier website. A server component that is designed to manage the interface to a single external system may hereinafter sometimes be referred to as an adapter. One embodiment of the present invention may use several different types of adapters (e.g., in order to normalize different types of interfaces to external systems as discussed herein). The term "search adapter" or "output adapter" may be used herein to indicate a server component that gathers information about a supplier's offerings. The term "reserve adapter" may be used herein to indicate an adapter that generates queries to a supplier website in order to ensure the existence of a purchase page corresponding to a user selection. The term "buy adapter" may be used herein to indicate an adapter that retrieves information to confirm a user's purchase transaction. The term "input adapter" may be used herein to indicate an adapter used to evaluate information from a user to determine if sufficient information (e.g., to form a travel itinerary) is present.

It is possible that, in the cases where a search adapter interfaces with a system other than a supplier website, that the supplier actually does not have a website that can be accessed by the user to make purchases. In this case, an alternative means for performing the purchase if the user selects an item returned for that supplier may need to be made available. For example (which example is intended to be illustrative and not restrictive), the owner of the search system may have a parallel and related travel-agency website that can be used to purchase reservations for those suppliers that cannot support their own purchases.

Reference will now be made to the third category (e.g., one in which information is gathered by a search adapter making direct requests from a supplier's website/server which is designed to provide a human-usable interface). Of note, many of the considerations for this example may also apply to the operation of reserve adapters, as both reserve adapters and search adapters (that access a website) may generate a unique state within the supplier web server to which the user's web browser must be given access.

In one case of this third category, the supplier website may be designed such that all of the information that the supplier server requires in order to generate a purchase page is encoded within the purchase page URL. When this is the case, the user's web browser can be directed to the correct purchase page simply by the client instructing it to navigate to (load from) that URL. In one example (which example is intended to be illustrative and not restrictive), the URLs for each purchase page of this type may be transferred from the server to the client along with each search result item, so that the client can provide the "reserve" control's functionality completely without further client/server interaction.

In another case of this third category, some or all of the information required by the supplier web server to generate the desired purchase page may be stored in cookies that are set when a previous page of the search sequence is returned by the web server. For example, when a search adapter interfaces to a supplier website, it may occur that, because of the supplier web site design, the adapter has to access several pages of the supplier website in sequence, possibly emulating the operations of a human user filling out a data-entry form at one or more steps of the sequence. Along with the source for each web page returned to the search adapter by the website there may be one or more cookies. Because the adapter of this example may interact with the web server as if the adapter were a web browser, the adapter may store each cookie returned by the web server and transmit it back with the next request. However, since the web server depends on the values stored in the cookies in order to generate the correct pages, the cookies may have to be transferred from the server to the user's browser when the "reserve" control is activated.

In an embodiment of the present invention, all of the cookies set by all of the web servers from which items were found may be transferred to the client along with each data item. The cookies may be stored with the client and then, if the user selects a data item with associated cookies, the cookies may be set in the user's browser prior to it being navigated to the associated URL. In addition, if the purchase page of the supplier web site is accessed using a POST transaction instead of a GET, the client may also be supplied with a copy of the POST data created by the server for accessing the correct page. Thus, in this example, the client may execute the hand-off to a supplier website on its own, without further interaction with the system servers.

Of note, there may be some supplier web servers that are sensitive to the specific client (e.g., via testing the IP address or other mechanisms) from which they are accessed. Because of this, it may not be possible for the client web browser to access the same supplier web pages that are searched by the adapter. To provide users access to purchase pages provided by this type of server, the search system may include a "proxy" or content-forwarding capability (hereinafter sometimes referred to as web relay).

In this regard, when the user selects a "reserve" control associated with a data item returned by such a server, the user's browser may be navigated to a special URL served by the search system itself. The relay server may then fetch the matching page from the supplier website and present it to the client. This process would then repeat for each page of the supplier web site's purchase process. In order to provide a seamless navigation experience for end users, all subsequent navigation may be routed through the relay servers (e.g., because the user's session information related to a particular supplier may be possessed by the search system servers rather than the user's browser).

For performance reasons, every navigation event may not necessarily be routed through search system relay servers (e.g., because this may generate too high a volume of traffic on the servers). Therefore, the system may limit relay to only those URLs within the same supplier domain (on the other hand, for example, every navigation can be routed through the relay servers for the entire Internet if desired).

In an embodiment, the process of "web relay" may be different from conventional network proxy systems. Conventional network proxy systems typically require modification of the configuration of the networking hardware and software that interacts with them, but typically do not require modification of the logical URLs used to obtain data through the proxies. Alternately, an embodiment of web relay may require no modification to a system's networking configuration and instead may modify the URLs of web pages transferred and/or URL's embedded within the web pages transferred.

One implementation of web relay could be created in which all operations are performed by the relay server and it operates only by identifying URLs contained in web pages and replacing them with URLs pointing to the relay server. However, given the complexity of modern web pages, especially dynamically generated pages, it may be difficult to fully anticipate where all of the URLs might appear within the pages. For instance, some URLs will likely be within well known HTML tags, but others can be within quotes as part of a string inside of scripts, where the string can be referenced later in different parts of the page.

In order to correctly handle web pages in which the URLs identifying navigation destinations are difficult to statically detect or are created dynamically within the page, the search system of an embodiment of the present invention may use both the server and the client to detect URLs that should be rerouted through the web relay. For example (which example is intended to be illustrative and not restrictive), the client may capture all of the navigation events created by user actions in the main browser window before the browser actually begins to fetch data from the target URL. The client may then modify the URL to route the navigation to the relay server before allowing the main browser window to fetch data. By modifying the URLs in this manner, the client may reduce server complexity, lighten the server load, and improve system performance (e.g., by requiring less extensive web page processing when the relay server forwards pages from the supplier web site to the client).

The search system server/client web relay architecture may consist, for example, of server-side preprocessing of web pages served and client-side real-time processing of navigation destination URLs. In this example (which example is intended to be illustrative and not restrictive), for suppliers that require web relay in order for a user's browser to access a session started by the search system's servers, the URL passed to the client with a search result and associated with the result's "reserve" user-interface control will reference (one of) the search system's web relay server(s). When the user activates a "reserve" control with a web-relay'ed URL, the main window of the user's browser will fetch a page from the associated web relay server. In turn, the server will fetch the matching page from the supplier's web site. The web relay server may process the body of the page in order to replace URLs that refer to the supplier's web site with ones that refer to the web relay server, as described in more detail below.

The client portion of web relay may rely on the web browser forwarding navigation events to the client, and the client's capability of capturing these events before they actually cause data to be read from the Internet. After capturing these events, the client may redirect the browser navigation to the search system relay servers with all of the necessary data. Then the relay servers may fetch the correct pages from the supplier web site and send them back to the client (an advantage of using the client to modify/redirect URLs is that: (a) the client may be theoretically able to catch all destination URLs used, regardless of how they are stored in a web page or when and where they are actually generated; and (b) distributing the processing required for redirecting URLs relieves the processing load on the relay servers).

Referring now to an example implementation (which example is intended to be illustrative and not restrictive), the relay client may be implemented specifically for Microsoft Windows operating systems and the IE web browser. The relay client may use the COM ActiveX interface provided by IE to intercept and modify navigation events generated by user actions in the main browser window (of note, however, any environment that provides a mechanism to capture and modify user navigation events could be used).

More particularly, all of the functionality of the relay client in this example may be realized in an ActiveX browser helper object ("BHO"). The BHO may run in the same memory context as the browser and may detect any operation on the available windows and modules. The relay client functionality may be integrated into the same client BHO that contains the other portions of the client (of note, however, the client functionality related to web relay may alternatively be implemented in a separate BHO). The events that the BHO of this example handles for the client portion of web relay may include, but are not limited to, BeforeNavigate, NewWindow, and DocumentComplete.

In the BeforeNavigate event, the client captures the navigation events and checks whether the browser destination URL is already rewritten to point to the relay server. If not, and the URL does indicate the relayed supplier web site, the client rewrites the URL, cancels the current navigation, and initiates a new navigation event with the rewritten URL.

Special care may be used with supplier web pages that employ frames. A frame-organized display in a web browser is accomplished using one page that contains a frameset definition and URLs indicating the initial content for each frame of the frame set, and the separate pages identified by these URLs. Handling of framed pages may be accomplished by having the client ignore the BeforeNavigate event and letting the page containing the frameset load, unmodified, from its original URL on the supplier website. All of the subsequent navigation (loads) to the individual pages displayed in the different frames of the frameset may then processed by the relay functions of the client BHO. This method can be difficult to employ as there is no way to determine, before an HTML page is fetched, whether it contains a frameset definition or a regular page. However, in many cases, the fact that a supplier site uses frames may be determined statically at the same time that the search and/or purchase adapter(s) for the supplier site is developed.

An alternate method for handling relay of the pages that make up a frame-organized display may be for the relay server to modify the URLs, contained in the page with the frameset definition, for the individual pages that fill the display frames. This would ensure that, from the browser's point of view, all of the page components reside in the same Internet domain (that of the relay server). This may prevent the security "sand box" restrictions imposed on JavaScript executed within the pages by the browser's interpreter from interfering with the page having the same operation as it does when not relayed.

The NewWindow event allows the client to capture Internet Explorer's new window creation. When a user clicks a link in the displayed page that results in the creation of a new browser window, the client creates the new window itself so that it has full control of the new window, and will receive subsequent events generated from that window as well. These windows generally are invoked by JavaScript URLs (or URLs expressed in other scripting languages supported by browsers). Therefore, without client-side participation in web relay, in many situations the URL of the page intended to be displayed in the new window may not be generated correctly due to the relayed location in the address bar.

The client may handle these cases by passing the parent page's/window's unmodified URL to the new browser window in order to recover (regenerate) the original (unmodified) URL of the new window, and subsequently issue a new navigation from the new window. Again, special care may be necessary due to the differences in the various version of IE. For some older versions of the IE browser, the client cannot issue a new navigation during the event handling of BeforeNavigate for the new window. In order for the new window to be functional, the client may allow the first navigation event to be fetched unmodified to avoid having the browser hang. This may be done even if the URL for the navigation is wrong. Once the new window is open, the client may issue a new navigation with the correct URL after the previous navigation is complete, even in failure.

The DocumentComplete event involves the client being notified at the end of document loading in a browser window. If the client detects that this event occurs after the first document has loaded in a new browser window, the client verifies whether the loaded URL is the correct (relayed) URL or not.

If the URL is incorrect, the client uses the current location (URL) of the parent (creating) window to reconstruct a valid, relayed URL.

The client and server may be designed not to relay URLs used to load images and other embedded objects in the requested web page through the relay servers. These objects may instead be loaded directly from the supplier web site (this may be purely a performance optimization and not a requirement for the operation). However, by avoiding routing of these objects through the relay servers, it is possible that the relay server may not obtain all of the necessary session information (usually stored in cookies) sent from the supplier web servers along with one or more of these objects (and not the pages forwarded to the client). Therefore, the client may check the cookie store in the user browser to make sure it finds and forwards back to the relay server all of the related session information. Or, the server may simply know whether a supplier site requires all components of a web page to be relayed and so instruct the client.

In one example (which example is intended to be illustrative and not restrictive), the web relay server may be implemented using Java Servlet technology like other server portions of the search system (of course, as discussed above, the invention is not limited to any particular programming language or even to a software implementation).

In any case, when a request comes into a web relay server in this example the server first fetches the SessionInfo object (the same as used by the Copilot Servlet) stored in the search system based on the specific UID and SID. This SessionInfo object may contain information related to the particular user session, including (but not limited to) context information generated by search adapters accessing supplier websites. The relay server then retrieves the information from the SessionInfo object related specifically to this request, for instance, the cookies with the same domain as the requested website. Also, the relay server handles session information sent with the request from the client, if any.

The relay server then makes a request, on behalf of the user browser, to the supplier website. After the server fetches the requested page, it checks to see if this page originated from the same location specified in the request or if the request was redirected to a different location. The redirection can happen in three different cases, individually or in combination: (a) the redirected location is at a different security level, for example, from HTTP to HTTPS or vice versa; (b) the redirected location is at a different domain; and (c) the redirected location is at a different path.

In the first case, the relay server has to reopen the connection with the user's browser using the correct (new) protocol to avoid introducing a security hole in the client/supplier communication link. In the other cases, the returned page can have relative URLs that need to be resolved based on the redirected location rather than the original location, so the relay server responds by sending a redirection to the user's browser to make sure that all objects in the page are loaded correctly and that any subsequent navigations from this page have correct URLs.

For performance considerations, if any or all of the above cases occur, the relay server may cache the fetched page so that when the client subsequently issues a new request based on the redirection, the server can forward this page immediately without fetching the page from the supplier web server again.

After completing these steps, the server is ready to process the requested page. The relay server first checks whether the client is actively modifying relayed URLs. The relay client informs the server of its presence/activity by turning on the relay start switch in the page requests to the server. If the client is relaying, the server skips scanning and modifying the URLs in the page. Otherwise, the relay server processes the page contents received from the supplier web server, tries to find all the URLs possible in the page source, and modifies them so that they all point to the relay server.

Referring again to FIG. 6B, there are a number of business models which may be supported by the present invention and several different revenue streams that it could provide. For example (which example is intended to be illustrative and not restrictive) a search system according to an embodiment of the present invention may be financially supported by payments received for each user purchase of travel reservations that occur as the result of the system referring a user to a travel supplier website. Therefore, it may be desirable for the search system to generate reliable records of user purchases supported with information that the travel suppliers will acknowledge as proof of purchases.

In this regard, and as mentioned above, the portion of the search system operations involved with detecting and logging user purchases may be referred to as "buy tracking". As discussed herein, the client may store a list of strings, periodically updated from the server, that are used to determine which user actions are considered user purchases. This list may contain two strings per entry. One string may be the URL of a supplier web page to which users are directed following a successful purchase. The other string may be an extraction specifier containing instructions to the client as to the data that should be extracted from the page with the URL and POSTed to the Copilot Servlet.

In one example (which example is intended to be illustrative and not restrictive), a user purchase transaction may begin with the user being presented with a list of different travel options that the search system found from a number of suppliers. The user selects one of the presented options with the "reserve" control presented in the Bar. The client navigates the web browser to a purchase page on the selected supplier's website. The user may directly interact with pages of the supplier website, sometimes providing personal and/or payment information. Upon completion of the purchase, the supplier website may deposit the user on a "receipt" page that contains some type of purchase tracking information, such as a confirmation number or order number, but is not so limited.

In this example the client receives each URL that the browser attempts to fetch from the network. These URLs are compared against both of the URL lists that the client maintains. When the browser has navigated to a receipt page of a supplier website, the page URL matches an entry of the buy-tracking list of URLs. In response to this match, the client interprets the extraction specifier associated with the URL, and uses it to extract a portion of the web page content received by the browser from the supplier website. The extraction specifier may be created such that this string will contain the confirmation number (or equivalent) for the purchase. The client POSTs the UID/SID, the URL within the supplier website, and the extracted confirmation back to the server where it is logged and used to create an invoice for the supplier.

It is noted that the actual URL strings maintained by the client need not be exact/explicit URLs, but instead can be templates or regular expressions that match a family of actual URLs. This is convenient because some websites incorporate user-specific or transaction-specific information in the URL which is not significant to identifying the pages that are receipt pages.

Of further note, even though the client may be integrated with the web browser, the search system may not necessarily depend on the web browser to store state in cookies. This is in contrast to the cookies that the system may place with the web browser on behalf of a supplier website. Ignoring this latter type of cookie, which may be used, for example, only for those particular suppliers whose websites require it, the system may not necessarily need to set any cookies.

In this regard, the state used in the search system's operation may be stored, for example, in a number of locations. One location where state information may be stored is in the server, in the data-structure allocated for each SID, the SessionInfo object. Further, state information may be stored implicitly in the web pages (HTML and JavaScript) displayed within the Bar. Each time the server (e.g., Copilot Servlet) returns content (such as user-interface information or search results) to the client for display in the Bar, the Bar may retain that information. Thus, any information that is included in the page content sent to a specific client may be implicitly stored in the client and may not necessarily be required to be retained on the server.

In operation, the client/server system of an embodiment of the present invention may generate a significant amount of information (e.g., about the behavior of both users and suppliers). This information may be reliably retained so that the correct operation of the system can be verified, the system can be further tuned/improved, and because comprehensive data about buying and selling habits may be an asset of significant value.

At the most basic level, a significant amount of data may be logged simply by the HTTP server (httpd) processes running on each of the server systems. Because certain embodiments utilize HTTP protocol for the communication between the client and server, the httpd is responsible for determining whether each incoming request should be routed to one of the servlets, whether it is for a static piece of data (such as a graphic used by the client user interface displayed in the Bar), or for a page forwarded from a supplier website through web relay. Thus, each request from a client passes through an individual server system httpd and is logged, including some performance information and the response code the server returns to the client. In addition to the logging of transactions as they go through each server, the Copilot Servlet may also log each request that is generated to a supplier (e.g., by any of the various types of adapters), and all of the responses to that request.

For the server internal couplings between the servlets and the database servers, the search system may use a form of database connection pooling for all database connections. Opening and closing connections to a database may be a computationally expensive operation. In order to improve performance, connections may be created once and inserted into a pool. When the system requests a connection it may be delivered from the pool. When the connection is released or no longer needed by the system, it may be returned to the pool.

Figure 8:
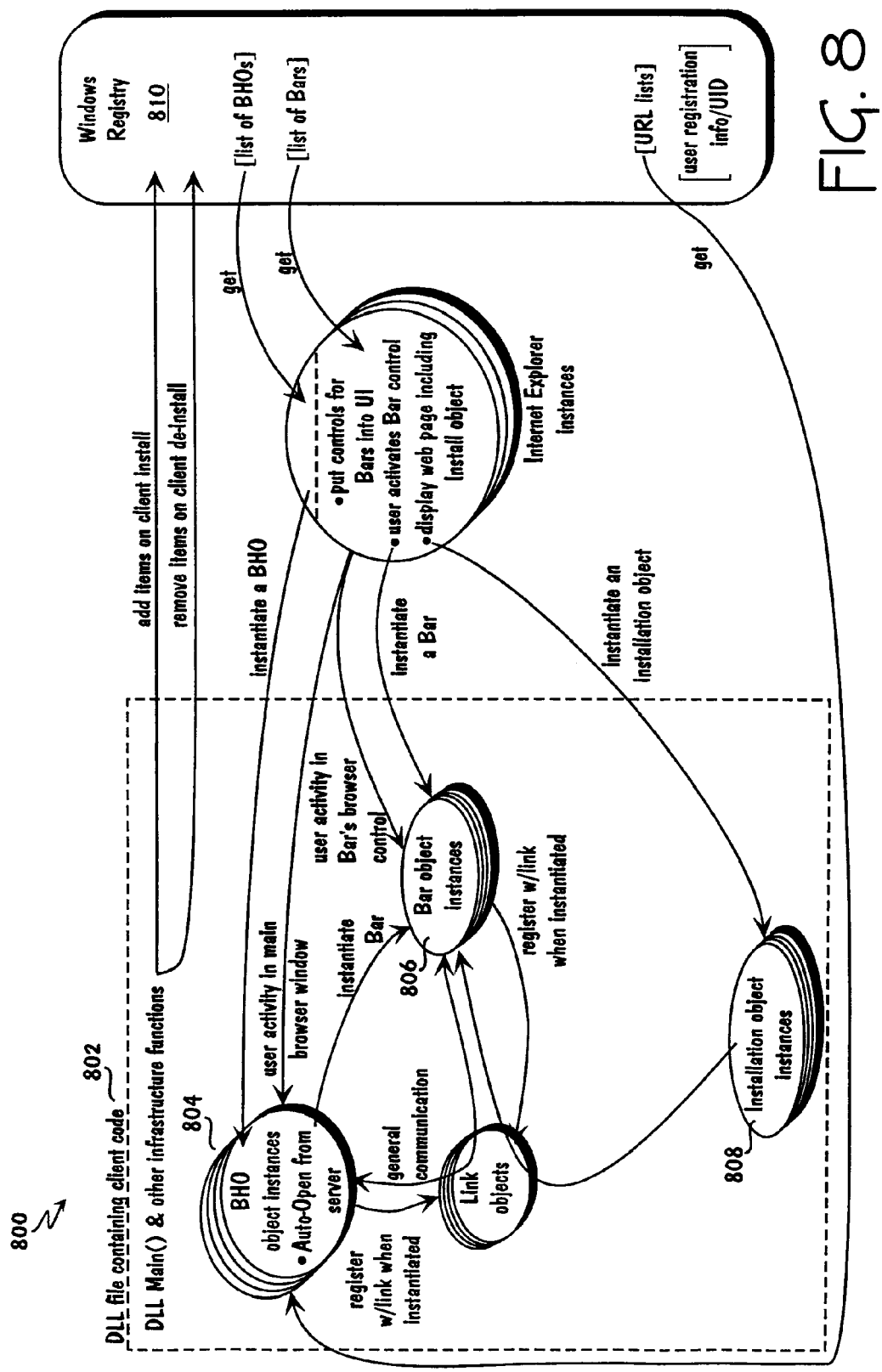
FIG. 8 shows client system organization according to an embodiment of the present invention.

Referring now to FIG. 8, a client system organization 800 of an embodiment of the present invention is shown. As discussed above, in one example (which example is intended to be illustrative and not restrictive), the client may be implemented for Microsoft Windows operating systems and the Microsoft IE web browser, using the ActiveX and Component Object Model ("COM") architectures/technologies (of course, there are many other system environments in which the client could be implemented).

As discussed herein, the client is implemented in this example as a set of COM objects that are packaged together in a single Windows DLL 802 for installation and use. There are three primary COM objects (objects that are assigned COM GUIDs and registered in the Windows registry 810) that make up the client in this example: (a) the Browser Helper Object (BHO) 804; (b) the Bar object 806; and (c) the installation object 808 (the division of the client into these primary objects 804-808 and the different minor (non-COM) objects is an artifact of restrictions imposed by the architectures of IE, COM, and ActiveX and is not necessary for all implementations).

In any case, the purpose of BHO objects in general is to extend the behavior and operations of Internet Explorer. When IE first initializes, IE searches a known area of the Windows registry for the GUIDs of registered BHOs. Internet Explorer creates an instance of each BHO that it finds, which includes (in this example) the client BHO. When the BHO is instantiated it couples to different portions of IE's COM interfaces so that it is notified of the user actions that must be monitored to determine if the Bar should automatically be opened.

After this initialization, the BHO monitors user actions until IE is terminated and the BHO is destroyed. Unless the BHO observes a match between a URL being requested by IE and one of the entries on the URL list, no other actions need be taken.

Another task of the BHO in this example is to manipulate the Bar object based on feedback from requests submitted to the server. For example, if the BHO observes a match between a URL the IE is requesting and the URL list, it opens a new session (if not previously accomplished) and forwards the requested URL to the Copilot Servlet for further checking. If the Copilot Servlet returns a "1" string, indicating that it has started a search, the BHO creates a Bar object and opens the Bar sub-window on the screen if it is not already visible (of course, other embodiments may implement other return codes or strings that result in other types of actions).

After this, the BHO receives a URL that references the client's assigned (via load balancing) front-end server. The BHO uses the COM interface with the Bar to cause the Bar's browser control to load from the specified URL, which gives the Copilot Servlet the opportunity to transmit the HTML and JavaScript that form the client user interface. Subsequently, each time a new set of content must be sent asynchronously from the server (e.g., not at the request of the user or the JavaScript executing within the Bar) the BHO will again cause the Bar to navigate to the new, server-supplied URL.

Additionally, with the help of the Bar, the BHO may be responsible for implementing the client-side session time-out counter. The BHO maintains the counter, resets it when it detects relevant user activity (e.g., based on IE's navigating to new URLs at user requests), transmits the end-of-session message to the server when the counter expires, and receives "reset counter" messages from the Bar when the Bar detects user activity (e.g., such as manipulating controls within the HTML user interface displayed by the Bar) of which the BHO is not directly informed.

As part of managing the session time-out, the BHO may also periodically provide messages to the Copilot Servlet informing it that the session is still in active use by the user. This prevents the server from timing-out the session in the case where the user is performing actions that are entirely local to the client or that involve only a third-party or supplier website and which, therefore, do not cause the client to send requests to the system server.

Like BHOs, Bar COM objects are treated as a special type of extension by IE. A Bar object can be listed in the Windows registry in such a way that IE automatically creates toolbar buttons and menu entries within IE's user interface that correspond to the Bar. When the user selects one of these Bar-specific controls, IE automatically loads and initializes the Bar COM object, so that the Bar appears visible (e.g., as a sub-window in the left hand side of the IE window).

The Bar object may be capable of detecting whether the BHO object has already been created and initialized, or not, and of creating the BHO object if it does not already exist. While this may not always be necessary, there may be some cases where the BHO does not get created correctly when IE starts. Therefore, the Bar's ability to create the BHO may help ensure a working system at least from the point in time where the user explicitly attempts to open the Bar.

In one embodiment the Bar may be responsible for the user-visible and user-interface aspects of the client. However, there may actually be very little software code involved in this aspect of the client because the Bar object may take advantage of the browser control COM object that IE makes available. Essentially, instead of actually drawing and managing a user interface itself, the Bar object may take the area of the display screen for which it is responsible and fill it completely with a browser control. The browser control behaves like a web browser application, interpreting HTML, JavaScript, and all other data types supported by the IE installation, except that the browser control takes commands from the Bar software instead of having a user interface (menus, an address bar, etc.) for them. This structure allows the user interface of the client to be rapidly implemented, easily modified, and easily updated (e.g., because the complete user interface may be fetched from the server on a regular basis, just like any other web page viewed).

Further, just as the BHO may receive notification of user events that occur as the result of user actions in the IE main window, the Bar object may receive notification of user actions that occur within the Bar browser control. With most of the appearance and behavior of the user interface encapsulated (in one example) in the "softest" portions of the client (e.g., the server-supplied HTML and JavaScript), the Bar object may need to perform only those portions of the client operations that require access to the operating system or an IE software interface that does not have a JavaScript-equivalent. Included in this category may be operations in which information or control is shared with the BHO, as there is no object in the JavaScript object model equivalent to either the generic, Microsoft-defined BHO interface or the BHO interfaces that are specific to the client implementation.

Figure 9:
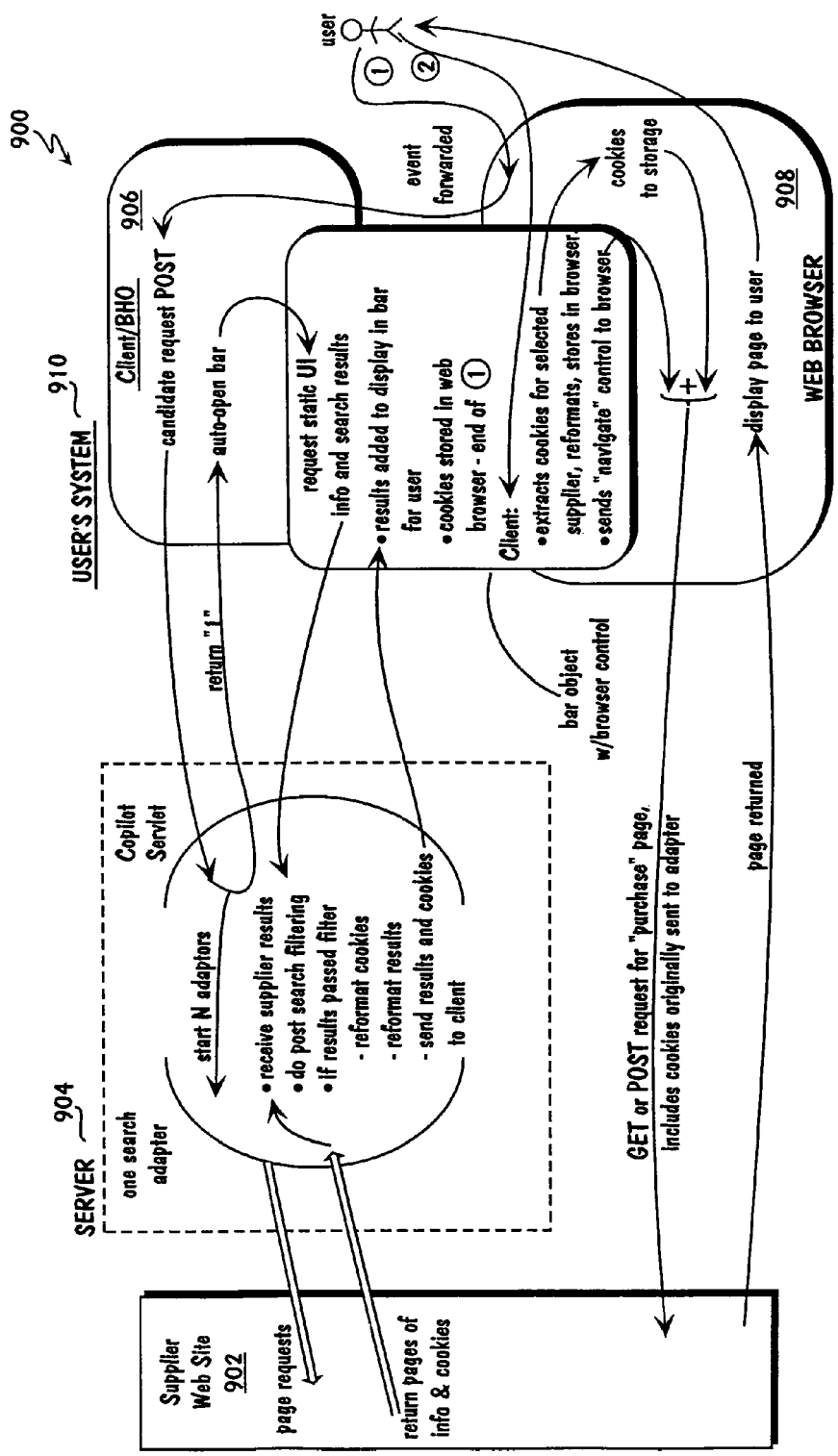
FIG. 9 shows a flow of supplier cookies according to an embodiment of the present invention.

Referring now to FIG. 9, a flow of supplier cookies 900 among suppliers 902, search system servers 904, and the client/BHO 906 and web browser 908 of user systems 910 according to an embodiment of the present invention is shown. Of note, this flow diagram is provided as an example only, and would be different for operational cases that do not use auto-open, that require web-relay for reserve/purchase and/or that search a source other than a supplier website.

Of further note, the Bar (for example) may perform the handling of several types of cookies, including (but not limited to): (a) cookies originally provided to the search system server (search adapter) by a supplier website that was searched; (b) cookies sent to the client from the server along with data items that originated on the cookie-generating supplier website; and (c) cookies set in the browser if the user selects the "reserve" control for a data item with associated cookies. This may be a non-trivial process because the normal behavior of a web browser is to note the Internet domain from which a cookie was originally sent and send the data for that cookie along with only those HTTP requests (GET/POST/ etc.) directed to the same internet domain. In fact, security considerations prevent most versions of IE from accepting cookies that are to be sent to a different domain than the one from which they are set. Thus, when the server sets cookies by sending them along with HTTP responses to the browser control in the Bar object, the browser control may associate these cookies with the internet domain containing the search system server and not the domain of the supplier web server that originated the cookies. Because of this, if no other action is taken by the client, the cookie values may not be sent along with the HTTP request for a "purchase" page from a supplier web site.

In this regard, in order to ensure that the cookie values originally sent by a supplier web server to the search server (e.g., a search adapter executing as part of the Copilot Servlet) are sent back to the supplier web server when the user's web browser attempts to access it, the client may manipulate the browser cookie storage directly. For example (which example is intended to be illustrative and not restrictive), when the server sends cookies from a supplier to the client, the server may modify the name of the cookie first, so that the revised cookie name contains the original name plus a text string identifying the supplier's internet domain.

When they are received by the browser control, the cookies from supplier website(s) may be stored as if they originated from the search system domain. When a "reserve" (purchase) control in the client user interface is selected by the user, the client may retrieve all of the cookies stored regardless of their original domains. The client then processes the cookie names to remove the originating-domain information (originally added by the search server before transfer to the client). An alternate embodiment has the client check each cookie to identify all cookies, based on their names, that should be set in the browser for the selected supplier web server.

In either embodiment, once the client has all cookies to be set, it processes the names to remove the domain information, and then calls an internal IE interface to set the cookies using the supplier web site domain as the domain to which the cookies should be sent. It is noted, for example, that the client does not necessarily "clean up" cookies that are stored on behalf of supplier websites. Instead, if the user performs several searches, the cookies stored as the result of each later search may replace the same-named cookies from earlier searches, so that the relevant cookie values are always current when they are needed.

Simplicity may be provided by the cookie handling methods of an embodiment of the present invention. More particularly, by sending all of the cookies from supplier website(s) to the client along with their corresponding data items, in most cases the client can handle the user selection of a "reserve" control entirely on its own, without making a new request of the server. This means that in some cases the server can, after logging, discard all information and data structures related to a particular user search as soon as that search is completed, without having to coordinate with the client JavaScript's time-out counter. One of the exceptions to this case may be supplier websites that are accessed from the web browser by web relay through the search system server. For these types of websites, the server may maintain supplier-specific information in order to perform the relay and fetch pages from the supplier website.

In an alternate embodiment of the present invention cookies may be handled by maintaining a list of cookies that match each search result on the server. The client then makes a separate request to the Copilot Servlet to retrieve the cookies when and if the user activates a "reserve" control.

In another alternate embodiment of the present invention the cookies may be stored with the client in a different manner. For example (which example is intended to be illustrative and not restrictive), in the HTML that is sent from the server containing each data item found during searching a block of JavaScript or HTML may be placed that includes the name/value pairs for all of the cookies associated with that data item. When the "reserve" control is activated, the JavaScript code executing within the Bar unpacks this list and provides it to the Bar object to be set within the browser. This method may be used instead of having the JavaScript code set the cookies, in order to avoid difficulties with setting cookies so that they appear to have originated from a domain other than the one that originated the page setting the cookies.

Of note, there may be other objects used within the client that are not exposed to the operating system and IE via COM. The design of and partitioning between these objects may be as desired and may be viewed as implementation choices.

Of further note, while it is possible for IE to create any of the COM objects that make up the client, and it is possible for the COM objects to create each other, it may be very difficult to establish links between the COM objects that make up the client if IE creates more than one of them.

For example, in a typical operating sequence, an instance of IE starts first; it then creates a BHO instance, and a Bar object is created later either by the BHO or by IE depending on whether it is opened automatically or explicitly by the user, respectively. However, IE does not provide a mechanism by which BHO objects can find already-created Bar objects or vice-versa. As a result, the BHO has no way of knowing if IE has already created a Bar before the BHO needs to open it automatically. Additionally, if for some reason the BHO is not created automatically (which may occur if the Windows registry section listing BHOs is corrupted), the Bar has no way to determine this so that it can create a BHO instance itself. Finally, with neither the BHO nor the Bar object being able to find the other through IE, it may be difficult to establish the communication between the two objects that is necessary for the operation of the client without compromising the object-oriented nature of the COM architecture.

Therefore, the client may use a small and well controlled work-around of the typical COM communication paths: the client may contain a "link" object which, due to its design and implementation, both the BHO and Bar COM objects can find and which they use as an intermediary to communicate with each other. The details of the link object implementation depend both on COM and on the source code implementation (e.g., C++). In this regard, in C++ nomenclature, the link object class contains a number of global methods (which, unlike normal methods, may be called by software that does not already have a pointer to a link object instance). These methods may be used by BHO and Bar objects to place pointers to themselves onto lists maintained within the (single) link object instance, and to retrieve pointers to the other type of object (BHO pointers for a Bar, or vice versa) from the link.

At this point it is noted that because of the way IE is implemented and how it handles the case in which the user opens multiple IE windows simultaneously, it is possible for multiple client BHO and Bar objects to be created on the same user system, and for some of them to be in the same address space while others are in different address spaces. Due to the implementation of the link object, there will only be one link object in a particular process address space, regardless of how many IE windows, BHOs or Bars IE creates within that address space. Each instance of a client BHO or Bar object registers itself with the single link object in its own address space and can therefore access all of the other client objects. Multiple, independent process address spaces have their own link objects and client COM objects in them are unaware of each other. However, since the goal of the link object in this case is to allow the client BHO and Bar objects associated with one IE window to communicate with each other (and that these will always be in the same address space), the ambiguity about the total number of link objects on a user system is unimportant.

Of course, the above described work-around may be unnecessary in an implementation of the client that does not use multiple COM objects.

Figure 10:
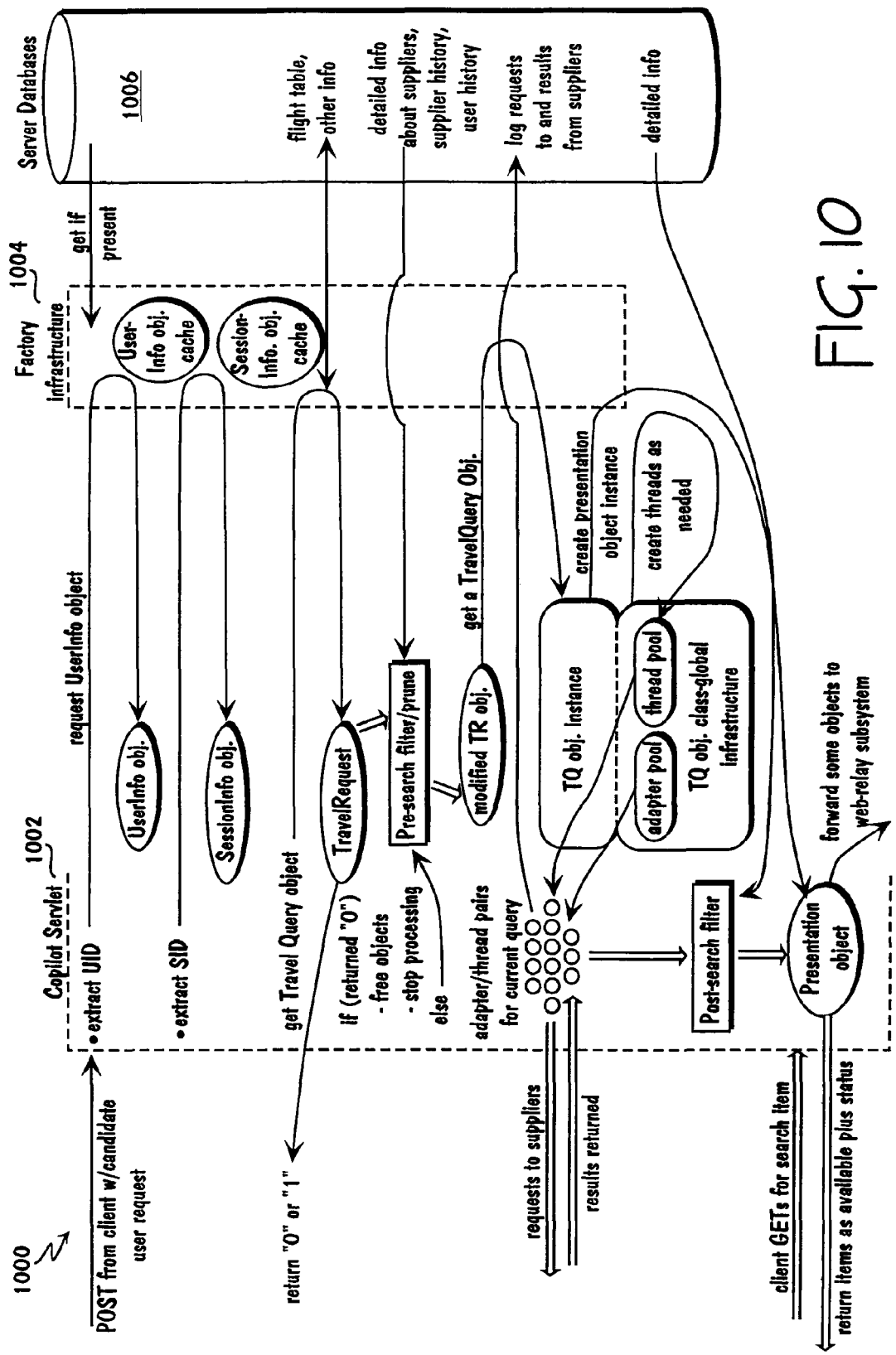
FIG. 10 shows Copilot Servlet organization according to an embodiment of the present invention.

Referring now to FIG. 10, a Copilot Servlet organization 1000 of an embodiment of the present invention is shown. This organization shows the information flow among the Copilot Servlet 1002, the factory infrastructure 1004, the search system server databases 1006, the clients (not shown), and the supplier servers (not shown), but is not so limited. For each search request received from a client, the Copilot Servlet 1002 processes it by creating lists of suppliers to search, pruning the search list, searching via adapters, carrying out post-search result pruning/filtering, and presentation.

More particularly, when the request is first received, the Copilot Servlet examines it to determine if it contains enough information to start a search. This process is performed by an input adapter module that is specific to the web page in which the user entered information, whether it was part of the client user interface or a third-party website. If the request does not contain enough information or is not actually a search request, a "0" (for example) is returned to the client and processing terminates. If it does, a "1" (for example) is returned and processing continues with the next step (of course, other embodiments may implement other return codes or strings that result in other types of actions).

The Copilot Servlet determines a set of supplier systems to search in an attempt to find items that best satisfy the received request. The determination may be made using information including, but not limited to, the contents of the information received in the request, the user's personal information, the user's current selections in the client user interface (e.g., if the Bar is open), the recent history of searches, the amount of bandwidth the searches have recently used on each supplier system, other information about suppliers, and/or the history of prior searches (e.g., of similar types by similar users).

The Copilot Servlet acquires a set of search adapter objects from an internal resource pool, and tasks one to search each of the selected suppliers. Each search adapter may perform its search independently and asynchronously from the others, so that the subsequent steps in the Copilot Servlet processing sequence can handle incremental search results.

The server may perform post-processing on the search results received. Post-processing may be used to reduce the number of results that are presented to the user below the number of raw results found from the various suppliers. This may be done in order to reduce the amount of data that the user has to sift through by providing only those results that are most likely to be selected.

This determination may be based on any desired criteria. For example (which example is intended to be illustrative and not restrictive), in the realm of air travel fares, many carriers quote fares much higher (e.g., 3 times or more) than their competition on some routes. Since it is unlikely that a user would select these particular travel options in the face of the competition, the server may best serve the needs of the user by not cluttering the list of results with this type of item. In another example (which example is intended to be illustrative and not restrictive), the server may take into account factors including, but not limited to: the user's explicit preferences (e.g., as indicated by the personal information entered); the user's implicit prioritization (e.g., as indicated by the current sort-order selection in the Bar); the particular user's past purchasing decisions when presented with similar options; and/or the past purchasing decisions of aggregate groups of users presented with similar options.

The complexity of making pruning/filtering decisions on the data items found may be increased by the results being received from different suppliers at different times, and being forwarded to the client for incremental display as quickly as possible. In order to provide incremental results to the client, the server may apply filtering decisions to individual search results without certain data about the results that may or may not be subsequently received from suppliers that have not yet responded to the search request. There are a number of possible mechanisms that the server could employ to accomplish this decision making.

In one example (which example is intended to be illustrative and not restrictive), a numeric score (applying the desired criteria) may be generated for each individual data item. Items achieving a score above a certain threshold may be sent on immediately, items falling bellow a lower threshold may be discarded, and those between the two thresholds may be retained for further consideration. The system may adopt a target number of results to return from any search (or possibly a different target number for each category of search, such as the air travel, hotel, and rental car reservation categories). Since the number of suppliers being searched may be known at the outset of a search (although an alternate embodiment can add the ability to start new searches of different suppliers incrementally if the initially-received results were judged inadequate), the threshold for deciding which results should be forwarded to a client can be adjusted up or down after each supplier's results are received and it can be determined whether the average number of results per supplier so far sent to the client is above or below the target average number of displayed results per supplier.

In addition to embodiments in which the processing from an individual user action through the delivery of information is performed interactively and as quickly as possible, it is possible for other embodiments of the system to have relatively long latencies, either due to processing requirements or intentionally introduced, between different steps. For example (which example is intended to be illustrative and not restrictive), an embodiment may gather information from very slowly-responding suppliers. In this case, a mechanism may be introduced in which result information was delivered to the user separately from their (possibly implicit) request, such as by sending them an email instead of immediately displaying the results in the client. In this case, multiple user actions may be detected as triggering search operations without requiring that one operation complete or be aborted before the next is detected. Similarly, when information delivery is delayed all of the search results may be accumulated together for a single delivery instead of delivering them incrementally. If this is done, different methods may be used for post-search filtering which may take advantage of the fact that all results can be filtered essentially simultaneously when the system is in complete possession of all of the relevant information, rather than with partial (incremental) information as described herein.

In addition, there may be cases in which delays may be intentionally introduced in the search system's operation. For example (which example is intended to be illustrative and not restrictive), the search system may provide a "notification" feature, whereby a particular (possibly implicit) user query is repeatedly processed over a period of time, and the user provided result information only when that information meets a particular criteria. Another possibility is that the search system performs both immediate data delivery as well as subsequent, non-interactive delivery. For example (which example is intended to be illustrative and not restrictive), in one embodiment the system could consider the final purchase of an airline ticket (as detected by the buy tracking mechanism described herein) as the triggering event for a new search. The system could perform this new search repeatedly over a period of time and filter the results using criteria based on the actual ticket purchased by the user. The system could then asynchronously notify the user if one of the periodic repeated searches finds a ticket that is better than the one the user purchased. In the arena of airline tickets, better might be constrained to be only a lower price for exactly the same ticket (as business considerations might limit the user from exchanging the already purchased ticket for any other alternative). Of course, embodiments designed to handle different types of information might not have such constraints.

Further, in cases where the search system is used to search for information relating to purchasable items that have time-limited availability, such as airline tickets, the system may incorporate special features in order for delayed information return to be helpful. For example (which example is intended to be illustrative and not restrictive), if the search system performs a search for a purchasable airline reservation delayed from the triggering user action, it is possible (if not likely) that the user will not be interacting with the client at the time results are obtained. Because of the fleeting validity of airline reservation information, the system could use a method for essentially immediately notifying the user so that a purchase transaction could be completed. Such a method could include the use of an email, instant messaging, a paging system, or an asynchronous message to a wireless client, but is not so limited.

An alternative to being able to reliably notify the user of an available (desired) purchasable item is to have pre-authorization from the user to make the purchase on their behalf. This may require that the user supply, either previously or as part of their (possibly implicit) search-triggering action, payment information, a purchase authorization, and adequate selection criteria so that the user is satisfied with purchases that are automatically made.

Following search result processing, the individual result items may be forwarded to the client. When forwarding results, each data item may be inserted into an HTML/JavaScript display template, combined with the cookies set by the supplier website (if any), and transmitted to the client.

The different server servlets of an embodiment of the present invention may be implemented using the object-oriented Java programming language. Given this, an implementation detail is how the system creates the different component objects that make up each servlet. In one example (which example is intended to be illustrative and not restrictive), a "factory" system may be used wherein a single, central piece of software, the factory, is called by all other portions of the software with requests to create new objects.

Thus, in this example, certain components (e.g., the larger components) in the system may not be created/referenced in a conventional way, but rather through component factories. The software modules using a component may never actually know which implementation of the component is returned by a factory for their use. Rather, they may communicate through an interface (an API definition for the component). When the module that will use an object returned from a factory has to get a handle to an implementation of the interface, they may request the handle from the factory. This may allow the factory to create the component at that point, or to retrieve it from a temporary storage place, or to construct it from data stored in a database. The factory may be the only system component aware of how the object instances are created and managed, and this may be changed without the awareness of any of the other software components communicating with or using the component.

Use of factories may also allow the implementation of the component to be changed without any of its users being aware that a change has taken place. In one example (which example is intended to be illustrative and not restrictive), the actual class instantiated by the factory may be determined by a property file (and may thus be changed without changing a single line of code). This mechanism allows rapid prototyping of new components, creating a so-called default implementation of the component (an implementation that returns valid results without implementing any of the real behavior of the component), and creates a complete system almost instantly. Individual developers can then work independently to create the actual components one by one, and replace the default components when the real components become available. The complete system may work at any time, and may be run and tested with the newly developed component by simply changing a property.

In another embodiment of the present invention a generic object caching mechanism may be used (e.g., in order to optimize the database accesses beyond the connection pooling mechanism described herein). The object cache may cache the data obtained from database accesses, and keep the object instance containing it available there for a future reference to the same data. After a certain period of non-use of the data, it may be automatically removed from the object cache. A next access of the data may again obtain it from the database. The object caches may rely on the principle of locality of time reference to reduce the actual requests that need to be made to the database. In one example (which example is intended to be illustrative and not restrictive), by implementing a generic base class that provides this functionality, it is easy to use object caching throughout the server.

Of note, use of a factory may abstract the implementation of object creation from the rest of the software. In particular, this mechanism may allow different objects that implement the same interface to be freely substituted for each other as the system implementation evolves. The particular object implementation that is used to serve each object-creation request that the factory receives may be controlled by a server configuration data file referred to as the properties file. Additionally, the factory may manage caches and pools of previously-created or pre-allocated objects (e.g., to optimize the management of memory and/or processing effort).

Of further note, the central decision-making modules of the Copilot Servlet may sometimes be referred to herein as the business logic. The business logic may include a portion of the servlet that is responsible for sequencing the operation of the remainder of the servlet. Any system changes necessary to accommodate coupling with fundamentally different types of client systems may be accomplished with the business logic. For example (which example is intended to be illustrative and not restrictive), a client that is a stand-alone piece of software that is not integrated into a web browser (e.g., as might be appropriate on a hand held processing device), may not need to exchange information with the server concerning whether the Bar should be automatically opened. This type of change may be incorporated in the server with changes in the business logic.

The sequence of object creation and use that the business logic uses when servicing a client request may include, but is not limited to: (a) creating a UserInfo object based on the UID in the request; (b) creating a SessionInfo object based on the UserInfo and the SID; and (c) creating a TravelRequest object. The UserInfo object may be created to hold information keyed from the UID. In one example (which example is intended to be illustrative and not restrictive), the UserInfo object is initialized with data for a particular UID only while a session for that UID is open, but the data it contains is not session specific. When there is not one or more active session for a particular user (UID), the contents of the UserInfo object may be stored in the server database until needed again.

When the UserInfo object is created by the factory, the factory may first check a cache of previously-created UserInfo objects and return an object from the cache if present. This may help minimize both object creations and accesses to the database (e.g., because multiple requests from the same UID are likely to occur together). If a UserInfo object for the desired UID is not present in the cache, a new UserInfo object may be created and the factory may attempt to populate it with data from the database.

New UID database entries may be created only when the Start Servlet (which may share much of the underlying infrastructure with the Copilot Servlet, including (for example) the UserInfo object and the object factory) requests a UserInfo object from the factory and the desired UID is not already present in the database. If other servlets request UserInfo objects for non-existent UIDs, matching objects may be created, or located within the cache (an exception may be logged as being potentially indicative of an attempt at unauthorized access to the system).

Just as the UserInfo object may be created to hold UID-specific information while processing a request, the SessionInfo object may hold SID-specific information. Like the UserInfo object, SessionInfo objects may be cached within the factory so that multiple, rapid uses of the same SID do not require corresponding SessionInfo objects to be created from scratch to serve each request.

In this example, unlike the UserInfo object, the contents of SessionInfo objects may not necessarily be stored by the server database (of course, the present invention is not so limited). Instead, SID-specific information may be maintained as long as the session is active and then discarded when the session terminates (except, for example, for the data logged by transactions while the session was active, which may be considered to be different from the randomly-accessible database records).

Referring now to TravelRequest objects, it is noted that these objects may hold information that is specific to each unique information request that is sent from the client. In an embodiment of the present invention implemented to search for information other than travel reservation information, there may be one or more equivalent objects for storage of the request information, but they of course would likely have a different name and implementation from the example TravelRequest object. The creation of the TravelRequest object may accomplish several parts of the Copilot Servlet function.

First, in the process of creating a TravelRequest object, the source of the information in the request may be identified. In general, a request may either originate from the itinerary-entry controls in the client user interface or in the equivalent data entry portions of a third-party web page. In either case, there may be a source-specific input adapter module that is used to process the content of requests that the client creates from user interaction with supported sources.

If the source of a request is not supported (for example, the request comes from a third-party website that is included in the client list of URLs that should be forwarded to the server, but the actual browser navigation event that the client forwarded is from or to a page of the website that does not perform itinerary entry), or if the input adapter determines that the request was incomplete and did not contain enough information to start a search, then the TravelRequest object may be created with a special value indicating that it is a non-valid request. This result causes the Copilot Servlet to respond to an incoming client request with, for example, a "0" string to inform the client that no additional data will be coming and that the Bar should not be automatically opened (if the Bar is already open, such a response does not result in Bar closure).

Assuming that enough information can be extracted from the client request to start a travel search, the TravelRequest object may be populated with the extracted information. Thus, the combination of the input adapters, which extract the information, and the TravelRequest object, which serves as a receptacle for the information, may serve to normalize the information needed to perform a search of suppliers into a common format for use by the rest of the Copilot Servlet components, regardless of the original source and format of the information.

Further, normalization of travel requests may include (for example) identifying the airports that are associated with the departure and arrival locations identified in the request (this may be useful because there may be a number of roughly equivalent ways in which users might specify the locations in their requests).

After the TravelRequest object is created, the business logic may process it through one or more pre-search filtering or pruning operations. Prior to these operations, the TravelRequest object may have information that identifies the broadest possible set of travel suppliers that can be searched to fill the requested itinerary. For example (which example is intended to be illustrative and not restrictive), in searching for available airline reservations, the present invention may build a list of all the airlines (suppliers) supported by search adapters for which at least one departure and arrival airport (as there may be more than one possible alternate at each end) are listed as being served by the airline in the server database.

Another technique for determining whether a travel supplier should be searched based on the origin and destination of the trip may use a data table based on the flights that a supplier actually provides, and incorporating service rules in its construction. In one example (which example is intended to be illustrative and not restrictive), the present invention may use such a table, which incorporates not only actual supplier flights but also a numeric preference value with each airport pair in the table. The preference value may be used during pruning, both by the explicit pruning mechanism and by any per-supplier pruning decisions made within search adapters, as a way to control the likelihood that a particular supplier will be searched for a given route, in light of other factors effecting search pruning.

Of note, filtering and pruning may form part of the optimization process even though the exact set of optimization criteria are likely to be specific to a particular information domain searched. To continue with the air travel example, there may be many idiosyncrasies in the way air travel is routed that could result in there not actually being any flights between two airports that are both served by the same airline. For example, if the airports are too close together, there may only be flights between them on commuter air carriers; larger carriers that serve both airports may either not have flights or have flights that are prohibitively priced. As another example, a single airline might serve two disparate regions, and even though one contains the arrival airport and the other contains the departure airport, the airline does not actually have flights between the two regions. Further, a particular supplier might be optimized out of the list to be searched based on user preferences and predictions made concerning the likelihood of a relevant result being returned from the search based on prior search system experience.

Another criterion which may be used to prune an air travel supplier out of the list of potential search targets may be the home country of the supplier. For example, even though British Airways files to/from many United States cities, it may only be searched if one of origin and/or destination airports is in Britain.

There are a number of system resources whose use may be improved by intelligently optimizing (e.g., reducing) the list of suppliers to be searched. One resource is network bandwidth between the server and the internet backbone. Because of practical constraints, each individual server of the search system will have a finite amount of network bandwidth that can be employed to perform searches. By predicting which suppliers that might be searched are most likely to return relevant (to the particular current user) results, the amount of search server bandwidth consumed by each search may be minimized, resulting in greater system efficiency and lower cost.

In this regard, note that another, essentially unrelated method of minimizing bandwidth may be to use proprietary search connections with as many suppliers as possible (e.g., instead of connections to human-oriented websites). This is because websites with human-friendly user interfaces typically transfer a significant amount of formatting and presentation information above and beyond the information actually of interest to the search server (wasting a significant fraction of the total bandwidth used to return results).

Another resource is the network bandwidth of the supplier server systems. Assuming a generally high market acceptance of the search system, the search system may be capable of generating significantly more total queries of supplier systems than the consumers using it would be able to generate on their own by accessing the same supplier websites. As such, the search system should not overwhelm the bandwidth (network and processing) capabilities of those supplier web servers that are accessed by search adapters. The pre-search pruning step may give the server the opportunity to remove a supplier from the list of suppliers to search based on the number of searches of that supplier that have been recently performed or are expected in the future (e.g., in the near future).

Yet another resource that can be optimized by reducing the number of suppliers to be searched (e.g., thereby improving the expected relevance of the results from each supplier) is the real time required for the search. The more rapidly the search system can respond to an individual user request for information, the more satisfied the user is likely to be. Even if there were no bandwidth and processing limitations, the search would complete sooner the fewer suppliers that are searched. In addition, by searching suppliers that are more likely to return relevant results, an implicit reduction is made in the total number of results that will be displayed to the user. The shorter and more concise the result list the user has to review, the more the user may likely perceive that the search occurred rapidly (even if it actually took the same amount of real time). In any case, at the conclusion of the pruning operations, the TravelRequest object contains information identifying the specific set of suppliers that the system will attempt to search in response to the user's request.

Referring now to the TravelQuery object, it is noted that this object may manage the actual search process. In one example (which example is intended to be illustrative and not restrictive), the TravelQuery object may manage class-global pools of idle processing threads and pre-created search adapter objects. When a new TravelQuery object is instantiated with a TravelRequest object, the TravelQuery object may obtain one thread and one search adapter for each supplier that the TravelRequest identifies as a search target. If the pools do not contain enough items to execute a particular query, more items may be created. The TravelQuery may assign one supplier to each thread/search adapter pair and start the search operations.

The server system may perform numerous tasks in parallel. In order to achieve this parallelism, a number of independent processing threads may be created. Once the task has been completed the thread can be discarded. Since many of the tasks are of a similar nature, the system may instead use a thread pool. This saves the overhead of constant thread creation and destruction, and makes optimal use of the thread resources. When a task needs to be accomplished a thread may be allocated from the pool and associated with the task. The thread then executes the task until completion after which the thread is returned to the pool. When no thread is available in the pool a new thread may be automatically created, and returned to the pool after task execution. In order to protect against possible errors or memory leaks, a thread may be re-cycled after it has executed a certain number of tasks. At this point the thread may be destroyed instead of being returned to the pool (this mechanism may also automatically maintain the pool size at an appropriate level).

When each supplier search completes, the search results may be provided to the request's Presentation object and the processing thread and search adapter objects may be returned to the pools. Both pooled threads and adapters may have their life spans monitored and may be destroyed after they have been used a certain number of times (e.g., 100 times). This may be done as insurance against the possibility of memory leaks or other potential mild-impact bugs in the servlets or the server operating system that could accumulate if the objects were allowed to persist indefinitely.

Of course, it may be possible for a user to abandon a search while it is still in progress. This can occur due to a number of different user actions, ranging from abruptly closing the Bar or the entire web browser, to manipulating a client user interface control so that the search results are no longer displayed, or even by selecting the "reserve" control associated with an already-received data item. When this occurs, neither the server in general nor the individual search adapters may be explicitly notified and all of the Copilot Servlet objects involved in a particular search may be allowed to complete the search. This may help prevent the connections between individual search adapters and supplier systems from being abruptly terminated (which might, for example, have undesirable side effects for the suppliers).

Instead, the TravelQuery object may contain a flag indicating that processing should continue on the current query. If the user abandons a search (in a way that is detectable by the server) this flag may be cleared. Each time an active search adapter reaches a point in the sequence of transactions with its supplier where the supplier system is in a stable state, the adapter may check the flag and, if it has been cleared, stop its operations.

In one embodiment of the present invention there is a different search adapter module (object class) for each supplier system that is supported for searching and for each different search procedure that may be applied to a particular supplier. In this regard, the search adapters may be configured such that they are easy to create and modify, as they may often be customized to the design and content of a supplier's human-accessible website. Thus, the search system may be monitored to ensure that changes to supplier websites that stop the adapters from functioning do not occur (or are corrected quickly).

Within each search adapter there may be logic that applies supplier-specific algorithms to perform further pruning, to determine if the search of the supplier is actually appropriate for the current query. For example (which example is intended to be illustrative and not restrictive), there may be air travel suppliers that may not accept bookings for very near-term flights (e.g., departing less than five days from the day of purchase). In this example, it may be the responsibility of the individual adapter to determine if the current request is or is not likely to produce useful results if carried out for the adapter's supplier (by placing the responsibility for detailed supplier-specific decisions in the search adapters, it reduces the need to make descriptive/predictive information available to the higher-level pre-search pruning logic).

Another aspect of supplier-specific decision making carried out by the individual search adapter may be regulation of the amount of bandwidth consumed by searches conducted on the adapter's supplier. This may be accomplished through a combination of supplier-specific code and data (such as the desired maximum amount of bandwidth to consume from the supplier) plus code that is part of the search adapter base class and implements the bandwidth-tuning algorithm. In one example (which example is intended to be illustrative and not restrictive), the algorithm may include a digital phase-locked loop (PLL). In order to allow the high-level pre-search pruning logic to take advantage of the decisions made by individual search adapters, each search adapter may return status information to the TravelQuery object indicating whether or not it has started a requested search. This may allow the pre-search pruning to start additional adapters if any of its first choice of adapters decides that performing the search is not actually appropriate. Similarly, when the high-level pre-search pruning logic requests that a search adapter start a search, the high-level pre-search pruning logic may provide a numeric preference value (e.g., indicating the degree to which the pruning logic wants the adapter to perform the search). Each search adapter may be free to interpret the preference value relative to supplier-specific criteria.

In one example (which example is intended to be illustrative and not restrictive), multiple search adapters for the same supplier may be installed in the search server. The decision making in different adapters for the same supplier may be made to be complementary, so that only one of the adapters (if any) will actually perform a search for the same request (this may help ensure that the user will not be presented with multiple duplicate search results).

In another embodiment the present invention may use the presence of different types of adapter files to automatically determine the set of options available to the system. For example (which example is intended to be illustrative and not restrictive), the server may maintain a copy of the URL lists stored on the client at all times (one URL list may directly correspond to the available set of input adapters while another URL list may correspond to the set of buy adapters). Each time the system detects a change in the set of available adapters, it may update its internal URL lists and the associated revision number. Subsequently, when new client sessions are established, the clients may receive the new revision number and therefore download the updated URL list.

In one example (which example is intended to be illustrative and not restrictive), the revision number for each URL list may include three numbers. The first two numbers may come from the properties file while the third number may be automatically incremented by the server in response to detecting changes in the available set of adapters. In a similar, internal manner, the list of suppliers that is used to create the original list of candidate suppliers to search for a request may be based on the set of search adapter objects that are currently available. Note that it may be possible for an adapter to be added to or removed from the bytecode directory as well as being replaced, and the system may reflect these changes in the available set of options as well (this may be accomplished, for example, by a server process that periodically examines the bytecode file directory for the addition or removal of adapters).

As discussed herein, the server may use at least one set of configuration data stored in the properties file. It may be possible to implement the creation of search adapter objects based on a list of suppliers to be searched contained in the property files. Another implementation may be to determine the set of available adapters based on the Java bytecode files currently located in the search adapter executables directory on the system servers.

The implementation of the search adapters may benefit from an object-oriented programming language and design style. In this regard, search adapters may be created as child classes from a large search-adapter base class that provides common behaviors, interfaces, and services to ease the development of individual search adapters (and the same for other types of adapters). In particular, the base class may (1) implement all of the adapter's interfaces to the other server components, and (2) implement a selection of primitive and/or common "tool" methods that specific search adapters can use to parse and extract data from web pages returned from requests the adapter makes to supplier web servers.

Another function of search adapters that may be implemented in a base class may be the detection and tracking of errors. Because search adapters interact with other unrelated systems across a coupled network or Internet, there is always the possibility that their operation will fail. The search system of the present invention, however, may be made very tolerant of individual search failures (e.g., because there are so many potential travel alternatives that can be presented from other suppliers). In this regard, the search adapters may track the number of failures from a particular supplier and a significant number of failures from the same supplier can be indicative of a change in the supplier website that will require a change in the search adapter in order to allow it to operate reliably again (in one example (which example is intended to be illustrative and not restrictive), there may be a mechanism to cause the detection of groups of search failures to automatically trigger the paging of an operator).

Moreover, as the search adapters may be constructed using a common base class and implement identical interfaces, it may be easier to use the search adapters in contexts other than the complete search system and the Copilot Servlet. For example (which example is intended to be illustrative and not restrictive), during the development of search adapters, a separate piece of "test harness" software may be used to task individual adapters with specific searches under the control of the developer, circumventing the rest of the intelligence in the Copilot Servlet (which might serve to make testing of individual adapters more difficult).

The Copilot Servlet may make on-the-fly decisions for each set of search results provided by a search adapter regarding which of the result items are appropriate to forward on for display in the client. This decision, like the processing which may be performed on or within the TravelRequest object to prune the set of suppliers to search, may be accomplished by a series of pruning/filtering operations performed on the search results once they are received.

The final object in the chain of the Copilot Servlet processing for a particular client request is the Presentation object. This object may receive the different travel search results, asynchronously, after filtering, from the TravelQuery. The Presentation object may be responsible, for example, for encapsulating the raw search results into HTML that is appropriate to the HTML already sent to the browser control in the Bar.

In general, there may be a single Presentation object associated with a SessionInfo object. The Presentation object may retain the result data from the most recent of each different type of data search performed by the user. In one example (which example is intended to be illustrative and not restrictive), this may include up to three sets of data: one each for air travel reservations, hotel reservations, and rental car reservations. Each time a new TravelQuery is created/started for a user session, it may be given a pointer to the SessionInfo object's Presentation object. Because TravelQuery objects may not be immediately destroyed if the user abandons a search, it may be possible for the Presentation object to receive interleaved results from multiple TravelQuery objects essentially simultaneously. In order to allow the Presentation object to retain the information from the most recent search and discard the rest, each TravelQuery object may be assigned a different search ID number, and the Presentation object may discard search results marked with any search ID other than the most recent (of a particular type).

Regarding databases and database content, there may be a number of logically-separate databases used by the server system. A collection of server systems may share one or more common, redundant database systems. One set of data stored in the server database may include copies of commercially available flight tables. This table may list all of the available commercial airline flights by supported suppliers. Not only may this table be accessed directly, but it may also contain the raw data from which the short list of suppliers that service listed airports is taken in construction of the first-order list of possible suppliers to search for a particular request.

In another embodiment of the present invention the so-called "web specials" of travel suppliers may be found and made available to users. This functionality may be made available because the present invention may be capable of directly accessing suppliers' websites (a web special is a discounted price on an otherwise-available ticket that is offered only to people purchasing the ticket through the supplier's website).

In this regard, in order to optimize the list of suppliers that should be searched for a particular request, the system may need to have information about which suppliers are likely to have which web specials available at any particular time. Unlike the information on regularly scheduled flights, which is essentially static, the set of web specials is highly fluid. Therefore, the database may contain a cache of the web specials available from each supplier that performs this type of marketing (the cache may be periodically refreshed, for example, by a pseudo-search request generated within the server).

While certain embodiments of the present invention provide for searching in direct response to a user action, other embodiments may additionally (or instead) employ automatic searching (e.g., performed asynchronously to user actions). Such automatic searching may be used to facilitate any stage of the system's operation. For example (which example is intended to be illustrative and not restrictive), automatic searching may be performed to pre-fill databases used as part of the filtering process before and after a search adapter operates. In another example (which example is intended to be illustrative and not restrictive), the results of automatic searching may be incorporated into the information that is returned to a user as the result of a query. Additionally, nothing in the embodiments described herein should be interpreted to limit the present invention to returning the information retrieved by search adapters to the user. For example (which example is intended to be illustrative and not restrictive), the results of queries to information suppliers could be used to filter the delivery of other data (possibly constant data or the results of automatic searching) to the user instead of the reverse.

As discussed herein, the UID-associated information may be stored in the database. This information may be updated, for example, when the user invokes the client user-interface for editing their preference information, and fetched into a UserInfo object each time a new client/server session is created.

Of note, while search adapters of certain embodiments of the present invention have been described herein as being able to access web pages (e.g., because it is common practice for information suppliers to make information available through web (e.g., HTTP) servers), such embodiments should not be considered limiting. For example, any network-accessible information source (whether it is intended to provide human-readable or machine-readable information) may be used in addition to or in place of a web server.

Similarly, data from web servers is typically broken into discrete blocks that are individually formatted for viewing by a user, referred to as web pages. However, this is an artificial division grown out of the general focus on using HTTP and HTML for a specific type of user-viewable information presentation, and should not be considered a limitation of the search system itself. In this regard, it is noted that by using discrete search adapters it may be relatively easy to modify the system to support different means of gathering and extracting information. For example (which example is intended to be illustrative and not restrictive), an information provider may use a system that does not return information in discrete "page" blocks and adapters may process information based on the reception and/or monitoring of the data stream carrying the information, rather than waiting for the reception of complete "pages" of information before processing.

As discussed above, in various embodiments of the present invention the search system may monitor user inputs to his/her internet browser in order to detect operations that can be interpreted as search queries.

In one example (which example is intended to be illustrative and not restrictive), the search system may monitor various types of user inputs to the browser (including, but not limited to): mouse pointer movement, selections, manipulation of user interface elements in a web page, data provided through web forms, the URLs of web pages requested and viewed, and/or the contents of requests made to web servers.

In another example (which example is intended to be illustrative and not restrictive), one data set that can be monitored is the contents of HTTP requests originating from the browser. Not only may these specify, through the URL, the next resource the user has selected to view, but "cookie" values and form input data included in the request which reflect the user's input to the HTTP server. This information may be used, for example, to determine if the user has filled in a form or otherwise made a request for information from a third-party system, for which an instance of the search system may be capable of attempting to supply relevant information. The search system may then respond to this type of user request (an implicit request, generated by the search system in response to a detected action) and begin interacting with the user. The search system's interaction with the user can, for example, be in parallel with the user's browser's HTTP request (e.g., wherein the search system allows the original user action to proceed) or in place of allowing the request to be sent (e.g., either canceling or suspending the request).

Further, on detection of such a search request (e.g., an implicit search request), the search system may respond in several ways. In one example (which example is intended to be illustrative and not restrictive), the search system may essentially immediately launch a search for information. In another example (which example is intended to be illustrative and not restrictive), the search system may notify the user that it has the ability to perform a search on the user's behalf and ask the user if it should proceed. In either case, whether the search is launched essentially immediately or only after user approval, the search(es) performed by the search system may be directed toward finding similar types of information to that requested from the third-party system, or complementary or otherwise related information.

Figure 11:
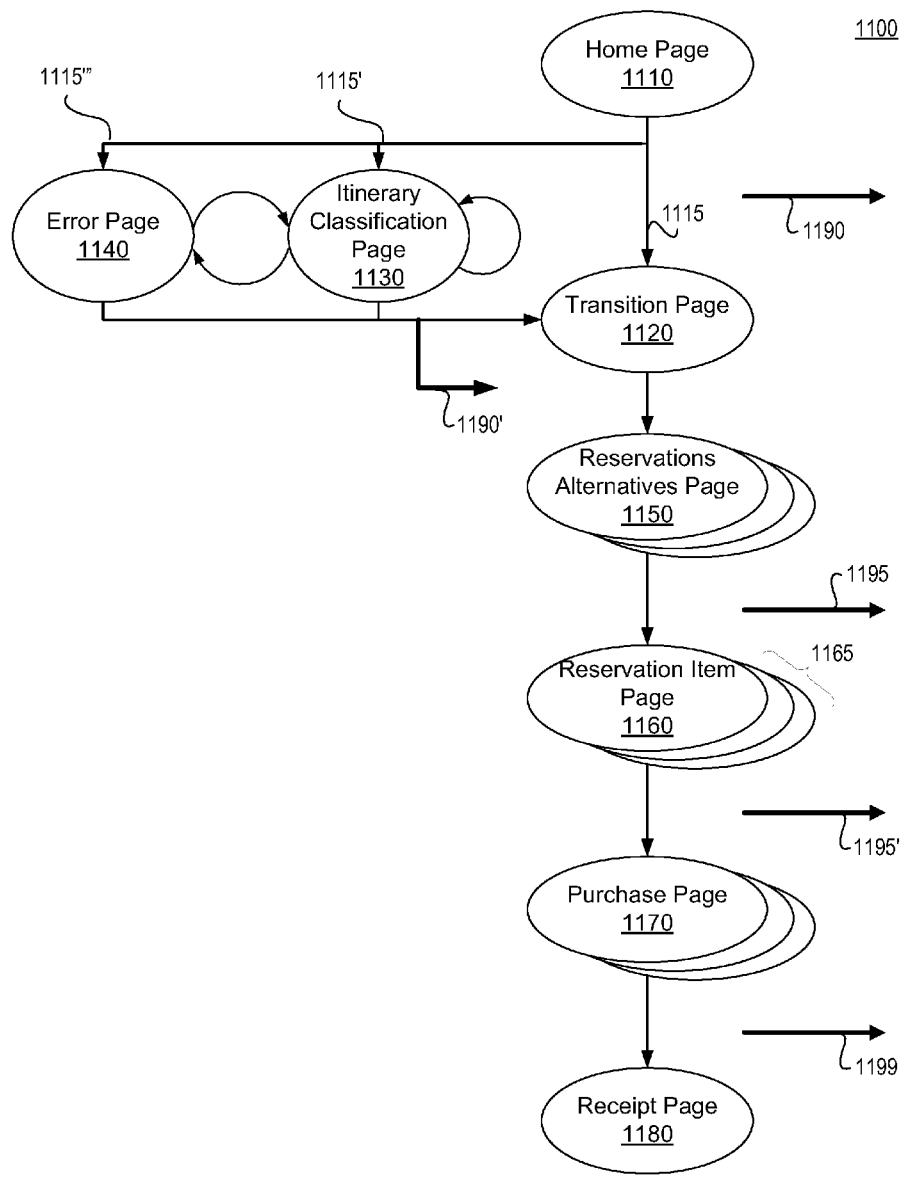
FIG. 11 shows a flow diagram of a user session with a third-party web site indicating the points at which an implicit search query may be captured and a search launched in an embodiment of the present invention.

Referring now to FIG. 11, a flow diagram 1100 of a user session with a third-party website indicating the points at which an implicit search query may be captured and a search launched in an embodiment of the present invention is shown. In this flow diagram, which represents a typical travel-agency website, each bubble represents a web page of content transmitted from the website server to the user's web browser. Each vertical arrow linking one bubble to the next indicates the navigation path (or sequence of pages) that may be followed by a user in a session with the website. Each horizontal arrow leading away from a bubble indicates the possible capture of a user action for processing by the system.

Typically, a session will begin with the website's home page 1110. Typical travel agency websites, in addition to explanatory text, advertisements, links to corporate information and policies and so on, have an itinerary entry form. For this example, the portions of the travel agency's website that are not involved with actually finding and purchasing travel reservations will be ignored. Some websites use forms spread over multiple pages to collect all of the necessary itinerary information. For this example, it is assumed that all itinerary information is entered on one page. After the user enters itinerary information, they will select a control that causes their browser to transmit that information to the website's server. Ignoring error conditions (discussed below), this will take them to the next page.

Travel agency websites typically take long enough to perform a search that they display a transition page 1120 whose purpose is to inform the user that their request has been received, is being processed, and the site will "get back to them" as soon as possible. Typically the operation of the website will generate browser navigation requests that cause this page to be replaced with the next.

After the transition page 1120 a travel agency website will typically display a reservation alternatives page 1150 for the user's desired itinerary. On some sites, this page may be the first of several, although the flow between pages for this possibility is not illustrated in the figure. The mechanisms used to display the reservation alternatives vary widely, but a common interface design is to require that the user select a particular one of the alternatives presented. This selection causes a new request to the web server, and a new page to be displayed.

The next page displayed is the reservation item page 1160, containing description information and selection controls for the particular reservation alternative the user selected in the previous page. The actual reservation item page 1160 viewed is typically one of a set of different reservation item pages 1165 that may be accessed from the reservation alternatives page 1150. From this page, the user will typically be given the alternatives of purchasing the reservation detailed on the reservation item page 1160 or returning to the reservation alternatives page 1150.

When the user elects to actually make a reservation, they will be taken to a purchase page 1170. This may be a single page as shown in this example, or multiple pages in a sequence or "funnel" used to complete the process of collecting payment information from the user and confirming their purchase.

Finally, websites will typically display a receipt page 1180 at the completion of a purchase transaction. While the user may continue to interact with the website, further interactions can generally be considered to be the start of a new session.

It is also common for the user to provide erroneous, incomplete, or ambiguous itinerary information. In these cases, the user will typically be shown an error page 1140. This page will explain the problem to the user, give them an opportunity to correct their input, and then continue on to the transition page 1120.

In the case of ambiguous itinerary information, the user will often be presented with an itinerary clarification page 1130. On this page, the website will present the different possible interpretations for itinerary information the user gave. For example, if the user provided the city name "Moscow" with no additional information, the website may present a page asking the user to select between "Moscow, Idaho" and "Moscow, Russia". After making one of these selections, the user can be taken to the transition page 1120.

In this example session (which example is intended to be illustrative and not restrictive), the first opportunity for the search system to automatically launch a search occurs when the itinerary entry form is complete and the user action to submit the form on the home page 1110 occurs. In an embodiment the search system detects the user action through monitoring and capturing navigation requests as they are sent to the website's server, represented by the navigation arrows 1115, 1115' and 1115" leaving the home page 1110 bubble. (Note that these three arrows all represent a single request. It is only after the website's server receives and processes the request that it is differentiated into the different possible responses the server can generate.)

In this example, the search system uses this first opportunity to possibly launch a comparison search 1190. In this case, the search system may launch a broad search for many different alternatives to present in parallel with the results displayed by the travel agency website in the reservation alternatives page 1150. Note that, unlike the travel website, if the itinerary information is erroneous or incomplete, the search system could do nothing at all and remain silent. The next opportunity to automatically launch a search in this example would occur after the user interacts with an itinerary clarification page 1130. Like the first opportunity, the search system may launch a comparison search 1190'. This case may be separate from the original comparison search 1190, because of the different ways in which the travel agency website may be architected. It is possible that the website uses the same basic HTTP request format for navigation requests generated by both the home page 1110 and the itinerary clarification page 1130, in which case the same itinerary parser could be used for both request sources. In fact, it might be difficult or impossible for the search system to distinguish between requests originating from the two different pages. However, it is also possible that the two requests are different and that even though the goals of comparison searches 1190 and 1190' may be essentially identical, they may require separate itinerary parsers within the search system.

Later in the user session, the search system has the opportunity to react to the user's selection of a specific reservation item, which generates the navigation request that takes the session from the reservation alternatives page 1150 to the reservation item page 1160. In this example, if an automatic search is launched at this point it may be a more narrow, focused selective search 1195. The intention of a search like this may be to find items that are a direct alternative to the item the user selected, and if the search is launched it may likely use different pruning parameters to choose the information sources searched.

Another opportunity at which the system may launch a selective search 1195' is as the user leaves the reservation item page 1160 for the purchase page 1170. The determination of whether the system should search at this point or the preceding one can be a subtle matter of user expectation and type of search behavior desired. For example, the user likely has a stronger commitment to purchase a particular reservation when leaving the reservation item page 1160 than when entering it. Whether this indicates that the search might better be launched earlier (e.g., because a less committed buyer might be more likely to choose an alternative the search system offers) or later (e.g., because a more committed purchaser could be a more valuable customer to a competitor) would depend on how the search system and its underlying business is optimized and tuned.

The final type of automatically-launched search shown in this example is the complementary search 1199. This type of search would be launched late in the user's session, and may be intended to find items that would "go with" what the user has selected to purchase. For example (which example is intended to be illustrative and not restrictive), if the user has purchased an airline reservation, the search system could launch a search for hotel reservations and/or for rental car reservations in the destination city.

As noted above, depending on the type of information that the search system is configured to find and present, the set of opportunities for detecting and launching a search can be quite varied, with the potential for multiple opportunities to occur within a single interaction session between the user and a third-party information system. As discussed, the particular opportunities for launching a search to which the search system actually responds may alter the user's perception of the search system and its capabilities, which in turn may affect the user's confidence and interest in the search results and ultimately their willingness to do business with the result provider.

In this regard, it is noted (as discussed above) that the search system may be intended to find and present information on the availability of travel reservations. Such a system may search information suppliers for available airline tickets, lodging reservations, rental car availability, travel packages, cruise reservations, bus service, train tickets, and so on. This system may detect implicit information requests by monitoring user interactions with third-party travel-related web sites. Depending on the particular third-party web site, there may be a number of points at which an implicit request can be made. The first point is likely to be when the user has entered itinerary information, such as their dates of travel, origin, and destination. With this information, the search system may launch a search for certain types of travel reservation information. If the user is searching for a particular type of travel reservation on the third-party site (an airline reservation, instead of a lodging reservation, for example), then the search system may confine itself to searching for only that type of information, or it may search for all of the types of information that it supports for which sufficient query information is available from the user.

Of note, some types of itinerary information may be desirable prior to starting a search. For example (which example is intended to be illustrative and not restrictive), a partial itinerary that contains only a departure date without a return date may not necessarily be usable to start a search, because it is may be difficult to guess an appropriate return date. Alternately, the search system may choose to launch a different type of search, potentially of radically different information sources. For example, in response to an "open" itinerary, the search system may search information sources that provide travel-availability information (times of day when flights in the desired market occur, or differences in potential cost of the trip depending on the different return dates the user may select.) Additionally, many details of an itinerary (desired seating class for air travel, quality and type of lodging, etc.) may be filled in with common values to allow the search system to launch a search with a less complete itinerary that might be available earlier in the session between the user and the third-party web site.

On the other hand, the user's query of the third-party information source may be even more focused, such as a reservation from a particular carrier, or a hotel room in a particular hotel or hotel chain, or a particular class or model of rental car. In this case, the search system may have the option of launching a broad search, possibly finding something the user hadn't anticipated, or launching a narrower or "specific" search, matching the information the user requested from the third-party source.

Note that in one embodiment the search system may perform multiple searches within a single user session on a third-party system. In the travel case, the system may begin by launching a broad search based on the initial itinerary information supplied to a third-party system. Then later in the session, the user may select a specific item returned by the third-party system. The search system may respond by launching a more narrow search intended to "find a better deal." Where there is the potential for multiple searches to be launched in a single user session, the search system may provide the user a mechanism to retrieve those previously-viewed results that are still valid. Finally, the search system may further optimize its operations by retaining one or more of a user's most recently searched itineraries and the results returned by that search. Users sometimes repeat identical or almost identical searches within a session and, provided that the retained results have not aged beyond validity, performance may be improved by retaining these results and "pruning" out entire subsequent searches.

In addition, note that where the search system detects and responds to a user action, there may be several different possibilities encompassed. For example (which example is intended to be illustrative and not restrictive), detection of a user action can be done either directly, when the user is intentionally interacting with the search system, or indirectly, by the search system monitoring user interaction with other software and/or network services. That is, the search system may detect and respond to information or events generated by the user, information or events generated by software acting on the user's behalf, and/or information or events generated by a third-party system with which the user is interacting. For example, when the search system examines a web page returned by a third-party site containing price information for a hotel reservation the search system may respond to the third-party system's "action" of providing this information by launching a search specifically intended to find results that will compare favorably to this information (in a general case of a search system that is not specific to travel reservation or even retail information, the search system may respond to many events and types of information generated by a third-party information source—for example, a search system intended to find news articles on the Internet could detect news information presented by a web site and respond by launching a search for related news articles from other news information sources).

In an embodiment of the present invention certain features may provide a system which is: (a) easy and inexpensive to implement; (b) easy and inexpensive to maintain; and/or (c) provides low distribution costs. Further, certain features of the present invention may provide a system which promotes relationships with brand-loyal customers while also increasing awareness of other available suppliers through extensive comparison capability. Moreover, certain features of the present invention may provide a system which supports the capture of data on consumer and/or competitor behavior.

In an embodiment of the present invention, in which the search system is intended to search for travel reservation information, the information sources to be searched may be generally divided into two groups: the first group may comprise websites that are maintained by suppliers of particular travel items; the second group may comprise websites of various travel agency and/or broker organizations that sell reservations actually provided by other organizations (for the purposes of the present application the term "travel agencies" may include organizations with a broad range of business models, including (but not limited to) traditional travel agencies that receive fees from the travel suppliers, ones which receive fees from the consumers, ones which specialize in "distressed inventory," and/or ones which operate on an auction basis).

In another embodiment a method for a dynamic information connection search engine is provided, comprising: detecting at least one user action on at least one client computer and, in response, determining that at least one user is searching for supported information; extracting query information from the at least one user action, wherein the query information includes at least one category of the supported information; automatically selecting at least one supplier of the supported information using at least one server in response to the query information; transferring at least one query including the query information among the selected at least one supplier via at least one network; and generating at least one result list in response to at least one query response, wherein the at least one result list includes response information generated from the at least one query response and query status information.

In one example, the method may further comprise providing the at least one result list to the at least one user.

In another example, the at least one result list may further include at least one electronic link to the selected at least one supplier.

In another example, the detecting may further comprise: monitoring the at least one user action by capturing Uniform Resource Locators (URLs) from a browser of the at least one client computer; comparing a root portion of the captured URL with at least one list of strings stored by the at least one client computer; and forwarding a root-matching URL to the at least one server, wherein determinations may be made whether the at least one user action is a request for travel information and whether the at least one user action contains enough information to be the at least one itinerary component.

In another example, the method may further comprise establishing at least one coupling to the selected at least one supplier via the at least one network, wherein the establishing may include at least one method selected from a group including (but not limited to) requesting at least one web page from at least one website of the at least one supplier and using at least one proprietary coupling among the at least one supplier and at least one intermediary database, wherein the at least one intermediary database may comprise information on available inventory of the at least one supplier.

In another example, the method may further comprise establishing at least one coupling between the at least one client computer and the at least one server, wherein the at least one client computer may dynamically construct a name of the at least one server by concatenating string fragments including a string constant representing a fixed base part of a name of the at least one server, at least one random number converted into at least one character string, and a string constant representing at least one domain in which the at least one server is located.

In another example, the method may further comprise tracking a purchase of at least one itinerary component and maintaining proof of the purchase.

In another example, the tracking and the maintaining may comprise maintaining at least one buy-tracking list of string pairs on the at least one client computer, wherein a first string pair element may include a URL of a receipt web page of the at least one supplier, wherein a second string pair element may include an extraction specifier that specifies a purchase transaction identification string within the receipt web page, and wherein the purchase transaction identification string may be used as proof of purchase transaction origination.

In another example, the automatically selecting at least one supplier may comprise performing at least one evaluation using at least one search factor selected from a group including (but not limited to) information from the at least one itinerary component, preferences of the at least one user, personal information on the at least one user, at least one previous search history of the at least one supplier, and at least one search history of at least one search of a similar type and by a similar user.

In another example, the method may further comprise filtering the at least one query response using criteria selected from a group including (but not limited to) relative item pricing, preferences of the at least one user, personal information on the at least one user, sort criteria of the at least one user, past purchasing decisions of the at least one user, and past purchasing decisions of at least one aggregate group of users.

In another embodiment a method for locating and scheduling travel itinerary components in real time is provided, comprising: detecting at least one user action on at least one client computer and, in response, determining that at least one user is searching for travel information; extracting at least one itinerary component from the at least one user action; automatically selecting at least one supplier of the at least one itinerary component using at least one server; transferring at least one query among the selected at least one supplier via at least one network, wherein the at least one query is a request for purchase information on the at least one itinerary component; and presenting the at least one user with at least one result list in response to at least one query response, wherein the at least one result list includes (but is not limited to) the purchase information, at least one electronic link to the at least one supplier, and query status information.

In one example, the at least one itinerary component may comprise at least one component selected from a group including (but not limited to) airline reservations, lodging reservations, and ground transportation reservations.

In another example, the detecting at least one user action may further comprise: monitoring the at least one user action by capturing Uniform Resource Locators (URLs) from a browser of the at least one client computer; comparing a root portion of the captured URL with at least one list of strings stored by the at least one client computer; and forwarding a root-matching URL to the at least one server, wherein determinations may be made whether the at least one user action is a request for travel information and whether the at least one user action contains enough information to be the at least one itinerary component.

In another example, the method may further comprise determining whether the at least one user action contains enough information to be the at least one itinerary component.

In another example, the method may further comprise opening at least one sub-window on the browser when the at least one user action includes enough information to be the at least one itinerary, wherein the sub-window may accept entry of the at least one itinerary.

In another example, the method may further comprise capturing information from the at least one user action when it is determined that the at least one user action contains enough information to be the at least one itinerary component.

In another example, the method may further comprise capturing information from a third party website when it is determined that the at least one user action contains enough information to be the at least one itinerary component.

In another example, the method may further comprise updating the at least one list of strings, wherein updating may include transferring at least one updated list of strings from the at least one server.

In another example, the at least one itinerary component may be received from at least one location selected from a group including (but not limited to) the at least one client computer.

In another example, the method may further comprise establishing at least one coupling to the selected at least one supplier via the at least one network, wherein establishing may include at least one method selected from a group including (but not limited to) requesting at least one web page from at least one website of the at least one supplier, and using at least one proprietary coupling among the at least one supplier and at least one intermediary database, wherein the at least one intermediary database may comprise information on available inventory of the at least one supplier.

In another example, the method may further comprise establishing at least one coupling between the at least one client computer and the at least one server, wherein the at least one client computer may dynamically construct a name of the at least one server by concatenating string fragments including a string constant representing a fixed base part of a name of the at least one server, at least one random number converted into at least one character string, and a string constant representing at least one domain in which the at least one server is located.

In another example, the method may further comprise providing at least one coupling among the at least one client computer and at least one electronic site from which the at least one user can purchase at least one selected itinerary component.

In another example, the at least one electronic site may be selected from a group including (but not limited to) at least one supplier website, at least one captive purchase web site, and at least one third party web site.

In another example, the method may further comprise: tracking a purchase of the at least one itinerary component; and maintaining proof of the purchase.

In another example, the tracking and the maintaining may comprise maintaining at least one buy-tracking list of string pairs on the at least one client computer, wherein a first string pair element may include a URL of a receipt web page of the at least one supplier, wherein a second string pair element may include an extraction specifier that specifies a purchase transaction identification string within the receipt web page, and wherein the purchase transaction identification string may be used as proof of purchase transaction origination.

In another example, the automatically selecting at least one supplier may comprise performing at least one evaluation using at least one search factor selected from a group including (but not limited to) information from the at least one itinerary component, preferences of the at least one user, personal information on the at least one user, at least one previous search history of the at least one supplier, and at least one search history of at least one search of a similar type and by a similar user.

In another example, the method may further comprise filtering the at least one query response using criteria selected from a group including (but not limited to) relative item pricing, preferences of the at least one user, personal information on the at least one user, sort criteria of the at least one user, past purchasing decisions of the at least one user, and past purchasing decisions of at least one aggregate group of users.

In another example, the method may further comprise sorting the at least one list using at least one sorting criteria from the at least one user.

In another example, the sorting may be performed on the at least one client computer.

In another example, the method may further comprise: generating at least one travel request object in response to the extracted at least one itinerary component, wherein the at least one travel request object may contain information on the at least one itinerary component and identifying information for the selected at least one supplier; and optimizing the at least one travel request object.

In another example, the method may further comprise tracking at least one time period selected from a group including (but not limited to) session periods, itinerary search time periods, result expiration time periods, and at least one travel category search result time period.

In another example, the method may further comprise providing at least one user identification number and at least one session identification number to the at least one server.

In another example, the method may further comprise maintaining at least one travel-special inventory for the at least one supplier, wherein the at least one travel-special inventory may be a current inventory of special deals on travel.

In another example, the query status information may comprise a total number of travel suppliers to which the at least one query is transferred, a total number of travel supplier responses received, a total number of data items found, a total number of data items processed, and a total number of data items presented to the at least one user.

In another example, the method may further comprise presenting the at least one user with at least one electronic link corresponding to each item of the at least one result list, wherein the at least one electronic link directs the at least one client computer to at least one page of a website from which the item can be purchased.

In another example, the website may be a supplier web site.

In another example, website may be affiliated with the at least one server.

In another example, the at least one client computer may comprise at least one processing device selected from a group including (but not limited to) personal computers, personal digital assistants, hand-held computers, cellular telephones, communication devices, and vehicle telematic systems.

In another example, the at least one network may comprise the Internet.

In another embodiment a search system for locating and scheduling travel itinerary components in real time is provided, comprising: at least one client computer that detects at least one user action and determines whether at least one user is searching for travel information; at least one server coupled to the at least one client computer, wherein at least one itinerary component is extracted from the at least one user action, wherein at least one supplier of the at least one itinerary component is automatically selected, wherein at least one query is transferred among the selected at least one supplier via at least one network, wherein the at least one query is a request for purchase information on the at least one itinerary component, wherein the at least one user is presented with at least one result list in response to at least one query response, wherein the at least one result list includes the purchase information, query status information, and at least one electronic link that supports purchase of the at least one itinerary component.

In one example, the at least one travel component may comprise at least one component selected from a group including (but not limited to) airline reservations, lodging reservations, and ground transportation reservations.

In another example, the detecting at least one user action may further comprise: monitoring the at least one user action by capturing Uniform Resource Locators (URLs) from a browser of the at least one client computer; comparing a root portion of the captured URL with at least one list of strings stored by the at least one client computer; and forwarding a root-matching URL to the at least one server, wherein determinations may be made whether the at least one user action is, a request for travel information and whether the at least one user action contains enough information to be the at least one itinerary component.

In another example, the at least one client computer may comprise at least one browser sub-window that is opened when the at least one user action includes enough information to be the at least one itinerary, wherein the sub-window may accept entry of the at least one itinerary component.

In another example, the information may be captured from the at least one user action, and it may be determined that the at least one user action contains enough information to be the at least one itinerary component.

In another example, the at least one itinerary component may be received from at least one location selected from a group including (but not limited to) the at least one client computer.

In another example, the at least one coupling may be established to the selected at least one supplier via the at least one network, wherein the establishment may include at least one method selected from a group including (but not limited to) requesting at least one web page from at least one website of the at least one supplier, and using at least one proprietary coupling among the at least one supplier and at least one intermediary database, wherein the at least one intermediary database may comprise information on available inventory of the at least one supplier.

In another example, the at least one client computer may couple to the at least one server by dynamically constructing a name of the at least one server by concatenating string fragments including a string constant representing a fixed base part of a name of the at least one server, at least one random number converted into at least one character string, and a string constant representing at least one domain in which the at least one server is located.

In another example, a factory logic section of the at least one server may create and populate at least one object in response to at least one request from at least one other logic section, wherein the at least one object may be used in at least one session of the at least one user.

In another example, the at least one object may comprise at least one user information object based on information of the at least one user, wherein the at least one user information object may be stored in at least one database upon completion of the at least one session, wherein the factory logic may search the at least one database for the at least one user information object upon initiation of at least one subsequent session.

In another example, the at least one object may comprise at least one session information object based on information of the at least one session.

In another example, the at least one object may comprise at least one travel request object based on information of the at least one itinerary component, wherein the at least one travel request object may include information identifying the at least one supplier.

In another example, the at least one object may comprise at least one travel query object that may be instantiated with the at least one travel request object, wherein upon instantiation the at least one travel query object may obtain at least one thread and at least one search adapter for each of the at least one suppliers, wherein the at least one thread and the at least one search adapter may control the transfer of the at least one query.

In another example, at least one coupling may be provided among the at least one client computer and at least one electronic site from which the at least one user can purchase at least one selected itinerary component, wherein the at least one electronic site may be selected from a group including (but not limited to) at least one supplier website, at least one third party website, at least one interface among the at least one server and the at least one supplier, and at least one database.

In another example, a purchase of the at least one travel component may be tracked and a proof of the purchase may be maintained.

In another example, the tracking and the maintaining may comprise maintaining at least one buy-tracking list of strings on the at least one client computer, wherein a first string may include a URL of a receipt web page of the at least one supplier, wherein a second string may include an extraction specifier that specifies a purchase transaction identification string within the receipt web page, wherein the purchase transaction identification string may be used as proof of a purchase transaction origination.

In another example, the at least one response may be filtered using criteria selected from a group including (but not limited to) relative item pricing, preferences of the at least one user, personal information on the at least one user, sort criteria of the at least one user, past purchasing decisions of the at least one user, and past purchasing decisions of at least one aggregate group of users.

In another example, at least one travel-special inventory may be maintained for the at least one supplier, wherein the at least one travel-special inventory may be a current inventory of special deals on travel.

In another example, the status information may comprise a total number of travel suppliers to which the at least one query is transferred, a total number of travel supplier responses received, a total number of data items found, a total number of data items processed, and a total number of data items presented to the at least one user.

In another example, the at least one user may be presented with at least one electronic link corresponding to each item of the at least one result list, wherein the at least one electronic link may direct the at least one client computer to at least one page of the corresponding supplier website from which the item can be purchased.

In another embodiment a computer readable medium containing executable instructions which, when executed in a processing system, provides a dynamic information connection search engine is provided, comprising: detecting at least one user action on at least one client computer and, in response, determining that at least one user is searching for supported information; extracting query information from the at least one user action, wherein the query information includes at least one category of the supported information; automatically selecting at least one supplier of the supported information using at least one server in response to the query information; transferring at least one query including the query information among the selected at least one supplier via at least one network; and generating at least one result list in response to at least one query response, wherein the at least one result list includes response information generated from the at least one query response and query status information.

In another embodiment an electromagnetic medium containing executable instructions which, when executed in a processing system, provides a dynamic information connection search engine is provided, comprising: detecting at least one user action on at least one client computer and, in response, determining that at least one user is searching for supported information; extracting query information from the at least one user action, wherein the query information includes at least one category of the supported information; automatically selecting at least one supplier of the supported information using at least one server in response to the query information; transferring at least one query including the query information among the selected at least one supplier via at least one network; and generating at least one result list in response to at least one query response, wherein the at least one result list includes response information generated from the at least one query response and query status information.

In another embodiment a method for locating and scheduling travel itinerary components in real time is provided, comprising: detecting at least one user action on at least one client computer and, in response, determining that at least one user is searching for travel information; extracting at least one itinerary component from the at least one user action; automatically selecting at least one supplier of the at least one itinerary component using at least one server; transferring at least one query among the selected at least one supplier via at least one network, wherein the at least one query is a request for purchase information on the at least one itinerary component; presenting the at least one user with at least one result list in response to at least one query response, wherein the at least one result list includes the purchase information, at least one electronic link to the at least one supplier, and query status information; and facilitating at least one purchase transaction comprising the at least one user purchasing at least one itinerary component chosen from the at least one result list.

Reference will now be made to another embodiment of the present invention (hereinafter sometimes referred to as "hotel sort optimization") via which various parameters of system operation (e.g., the sorting of a result list returned to a user) may be optimized.

In connection with this "hotel sort optimization", it is noted that a given hotel reservation may be available via one or more distribution channels, for example, from a hotel operator itself and from a third-party aggregator (such a situation is hereinafter sometimes referred to as "multi-sourcing). When such multi-sourcing exists, each supplier (or distribution channel) may differ in aspects which may be important to the customer (e.g., price) and/or the search system operator (e.g., referral fee). In this regard, the present invention may be configured (as discussed below) to only display one instance of a given hotel reservation to the user at any particular time.

In any case, in one example (which example is intended to be illustrative and not restrictive), this hotel sort optimization may be used to bias certain results higher on the result list.

In another example (which example is intended to be illustrative and not restrictive), certain results may be more profitable to an operator of the search system and such more profitable results may be moved higher up on the result list.

Figure 12:
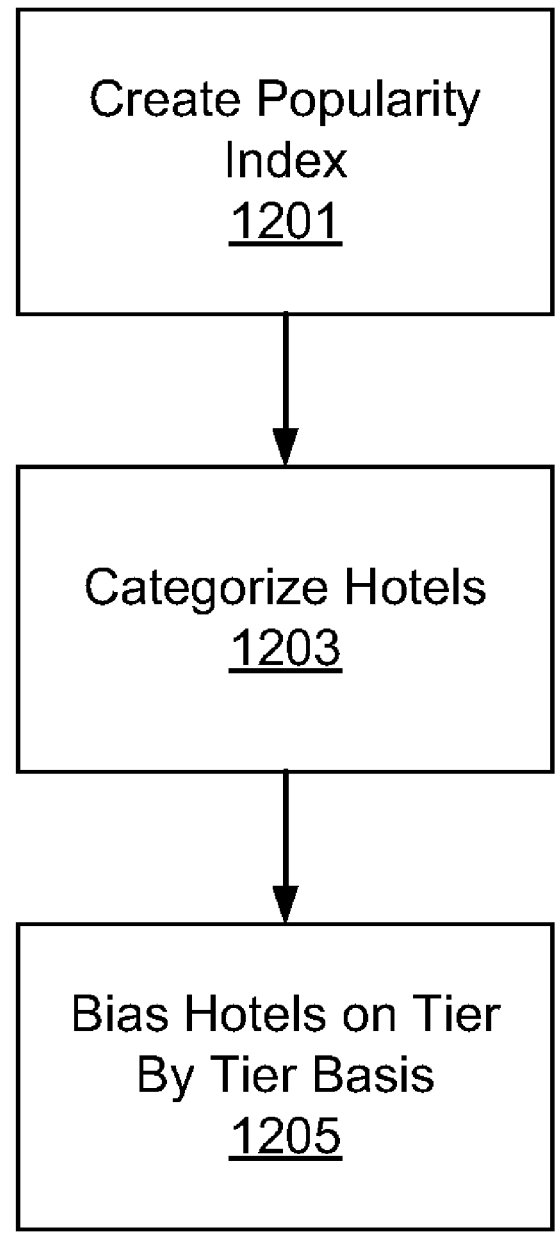
FIG. 12 shows a flowchart of a mechanism for biasing certain results higher on a result list according to an embodiment of the present invention.

Referring now to FIG. 12, one example flowchart (which example is intended to be illustrative and not restrictive) of a mechanism for biasing certain results higher on the result list according to this embodiment of the present invention is shown (this example assumes that a desired search has already been carried out (as described more fully herein) and that a number of hotels already populate a result list being filtered and sorted for display to a user).

More particularly, it is seen at step 1201 that a popularity index for every hotel in the result list is created (in one specific example (which example is intended to be illustrative and not restrictive), this popularity index may be the number of times that a particular hotel was booked (or viewed, or otherwise accessed) via the search system in the last (for example) 28 days). The popularity index for the current result list may be retrieved from a larger database containing popularity values for each of the hotel properties supported by the search system. This database could individually store the count of each day's popularity-generating events (whatever they may be), with an extra day's worth of storage in which the current day's count is accumulated. The entire system could be updated at a pre-determined time each day to discard the oldest day's worth of counts and to generate a new sum of the remaining information to be used as each hotel's popularity value for the next 24 hours. Of course, other periods could be used as well as other methods for accumulating popularity information that did not require data to be periodically discarded. For example (which example is intended to be illustrative and not restrictive), the accumulated popularity could be divided by two each day and summed with the new day's counts. This would lead to a system in which more recent information is much more heavily weighted in influencing popularity, but also in which the removal of older information occurs more "smoothly" than the first example.

Next, at step 1203 the hotels in the result list are divided into sub-lists based on their categorization (e.g., placed into a "tier 1" sub-list or a "tier 2" sub-list). Of note, tier 1 category hotels may all be displayed to the user above tier 2 category hotels regardless of further processing carried out at subsequent steps (of course, any desired number of categories besides tier 1 and tier 2 may be used). As with popularity, the categorization of essentially all hotel properties supported by the system may be determined prior to any individual search being performed. It may be that the particular categorization scheme(s) that a system uses will depend on the specific type of information for which it is configured to search and/or on the system's business goals. Even within this example, categorization could be performed based on information about the hotel or particular reservation, or about the information supplier through which a reservation is obtained. In particular, the result list may be divided based on a categorization of hotel properties or of reservation suppliers. If the latter (as in the case of reservation multi-sourcing), the same reservation may be available through multiple suppliers, and each supplier may be assigned to a separate category. In this case, it may be desirable to take categorization into account during the multi-source filtering of the result list.

Finally, at step 1205 the hotel reservation results are biased on a tier by tier basis. In one example, this may be done based upon the profitability of the hotel booking to the operator of the search system. In one specific example (which example is intended to be illustrative and not restrictive), the popularity index for each hotel may be multiplied by an effective dollars per booking value to the operator of the search system (for the specific supplier from which a reservation will be purchased if selected by the user) to generate a number which determines how high in the result list a given hotel should be displayed.

Of note, while a single hotel reservation may be available via one or more distribution channels (e.g., from a hotel operator itself and from a third-party aggregator), the present invention may be configured to only display one instance of a given hotel reservation to the user at any particular time (the choice of which distribution channel to display may be based, for example, on popularity, price and/or profitability to the operator of the search system).

Of further note, while the above example indicated that the popularity index is created "on the fly" (i.e., for each hotel in a given result list), such a popularity index for each hotel may alternatively be created, for example, periodically for each hotel that the search system is capable of finding.

Of still further note, while this embodiment has been described principally with respect to hotels, this aspect of the invention may, of course, be applied to other sorting needs, both within the field of travel reservation information (e.g., airline tickets and/or car rentals) and outside of it.

Of still further note, this aspect of the invention may, of course, be carried out using only a client-side application (e.g., residing essentially wholly on the user's computer), only a server-side application (e.g., residing essentially wholly on the search system server), a website application or a combination thereof.

While a number of embodiments of the present invention have been described, it is understood that these embodiments are illustrative only, and not restrictive, and that many modifications may become apparent to those of ordinary skill in the art. For example, various steps described herein may be performed in any desired order (and some steps may be eliminated and/or other steps may be added).

What is claimed is:

1. A computer-implemented search method, comprising:
   identifying a plurality of lodging reservations in response to receiving a request for lodging from a client;
   determining for each identified lodging reservation a measure of popularity and a measure of profitability of the lodging reservation to an entity that received the lodging request from the client;
   calculating a ranking score for each lodging reservation based on a multiplication of the measure of popularity and the measure of profitability determined for the lodging reservation;

determining an order in which to present the identified lodging reservations to a user using the ranking score calculated for each lodging reservation; and transmitting the identified lodging reservations to the client to present the lodging reservations to the user according to the determined order.

2. The method of claim 1, wherein the measure of profitability is determined prior to receiving the lodging request.

3. The method of claim 1, wherein the measure of profitability is determined periodically.

4. The method of claim 1, wherein the measure of profitability is determined responsive to receiving the lodging request.

5. The method of claim 1, wherein identifying the plurality of lodging reservations comprises:

transmitting a search request to one or more supplier servers, the search request generated based on the lodging request received from the client; and receiving the plurality of lodging reservations from the one or more supplier servers in response to the search request.

6. The method of claim 1, wherein the measure of popularity is determined based on a number of times the lodging reservation was booked by users within a preceding time period.

7. The method of claim 1, wherein the measure of popularity is determined based on an average number of times the lodging reservation was booked by users within a preceding time period.

8. The method of claim 1, wherein the measure of popularity is determined based on a number of times the lodging reservation was viewed by users within a preceding time period.

9. The method of claim 1, wherein the measure of popularity is determined based on a number of times the lodging reservation was accessed by users within a preceding time period.

10. A computer program product, comprising a non-transitory computer readable storage medium having computer program instructions and data embodied thereon to configure a computer system to order lodging reservations by performing operations comprising:

identifying a plurality of lodging reservations in response to receiving a request for lodging from a client;

determining for each identified lodging reservation a measure of popularity and a measure of profitability of the lodging reservation to an entity that received the lodging request from the client;

calculating a ranking score for each lodging reservation based on a multiplication of the measure of popularity and the measure of profitability determined for the lodging reservation;

determining an order in which to present the identified lodging reservations to a user using the ranking score calculated for each lodging reservation; and transmitting the identified lodging reservations to the client to present the lodging reservations to the user according to the determined order.

11. The computer program product of claim 10, wherein the measure of profitability is determined prior to receiving the lodging request.

12. The computer program product of claim 10, wherein the measure of profitability is determined responsive to receiving the lodging request.

13. The computer program product of claim 10, wherein the measure of profitability is determined periodically.

14. The computer program product of claim 10, identifying the plurality of lodging reservations comprises:

transmitting a search request to one or more supplier servers, the search request generated based on the lodging request received from the client; and receiving the plurality of lodging reservations from the one or more supplier servers in response to the search request.

15. A computer system configured to order lodging reservations, the computer system comprising:

a computer memory configured to store program code; and a processor coupled to the memory and configured by the stored program code to perform operations comprising:

identifying a plurality of lodging reservations in response to receiving a request for lodging from a client;

determining for each identified lodging reservation a measure of popularity and a measure of profitability of the lodging reservation to an entity that received the lodging request from the client;

calculating a ranking score for each lodging reservation based on a multiplication of the measure of popularity and the measure of profitability determined for the lodging reservation;

determining an order in which to present the identified lodging reservations to a user using the ranking score calculated for each lodging reservation; and transmitting the identified lodging reservations to the client to present the lodging reservations to the user according to the determined order.

* * * * *